US012571883B2

(12) United States Patent
Yang et al.

(10) Patent No.: US 12,571,883 B2
(45) Date of Patent: Mar. 10, 2026

(54) LIDAR ECHO SIGNAL PROCESSING METHOD AND DEVICE, COMPUTER DEVICE, AND STORAGE MEDIUM

(71) Applicant: SUTENG INNOVATION TECHNOLOGY CO., LTD., Shenzhen (CN)

(72) Inventors: Junpeng Yang, Shenzhen (CN); Xia Liu, Shenzhen (CN); Dongshan Liu, Shenzhen (CN); Changsheng Gong, Shenzhen (CN); Jiaxin Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 957 days.

(21) Appl. No.: 17/702,940

(22) Filed: Mar. 24, 2022

(65) Prior Publication Data

US 2022/0214429 A1 Jul. 7, 2022

Related U.S. Application Data

(63) Continuation-in-part of application No. PCT/CN2019/107880, filed on Sep. 25, 2019.

(51) Int. Cl.
*G01S 7/48* (2006.01)
*G01S 17/08* (2006.01)

(52) U.S. Cl.
CPC ............ *G01S 7/4802* (2013.01); *G01S 17/08* (2013.01)

(58) Field of Classification Search
CPC .......... G01S 7/4802; G01S 7/487; G01S 7/41; G01S 17/08
See application file for complete search history.

(56) References Cited

U.S. PATENT DOCUMENTS 5,646,628 A * 7/1997 Hedman ............... G01S 7/2926
342/195
2019/0025426 A1 1/2019 Satyan et al.

FOREIGN PATENT DOCUMENTS

CN 110967777 A 4/2020
WO 2021056269 A1 4/2021

OTHER PUBLICATIONS

International Search Report issued in corresponding International Application No. PCT/CN2019/107880, mailed Jun. 23, 2020, 9 pages.

* cited by examiner

*Primary Examiner* — Thanh Luu
(74) *Attorney, Agent, or Firm* — BAYES PLLC

(57) ABSTRACT
A LiDAR echo signal processing method is disclosed. The method includes: receiving an echo signal reflected by a to-be-detected object, where the echo signal includes multidimensional signal emission angles; buffering the echo signal based on the multidimensional signal emission angles to obtain buffered signals; when the number of buffered signals reaches a preset buffering number, extracting a target signal corresponding to a preset neighborhood window from the buffered signals; and performing non-coherent integration on the target signal and outputting the integrated target signal.

15 Claims, 14 Drawing Sheets

Receive an echo signal reflected by a to-be-detected object, where the echo signal includes multidimensional signal emission angles — 202

Buffer the echo signal based on the multidimensional signal emission angles to obtain buffered signals — 204

When the number of buffered signals reaches a preset buffering number, extract a target signal corresponding to a preset neighborhood window from the buffered signals — 206

Perform non-coherent integration on the target signal and output the integrated target signal — 208

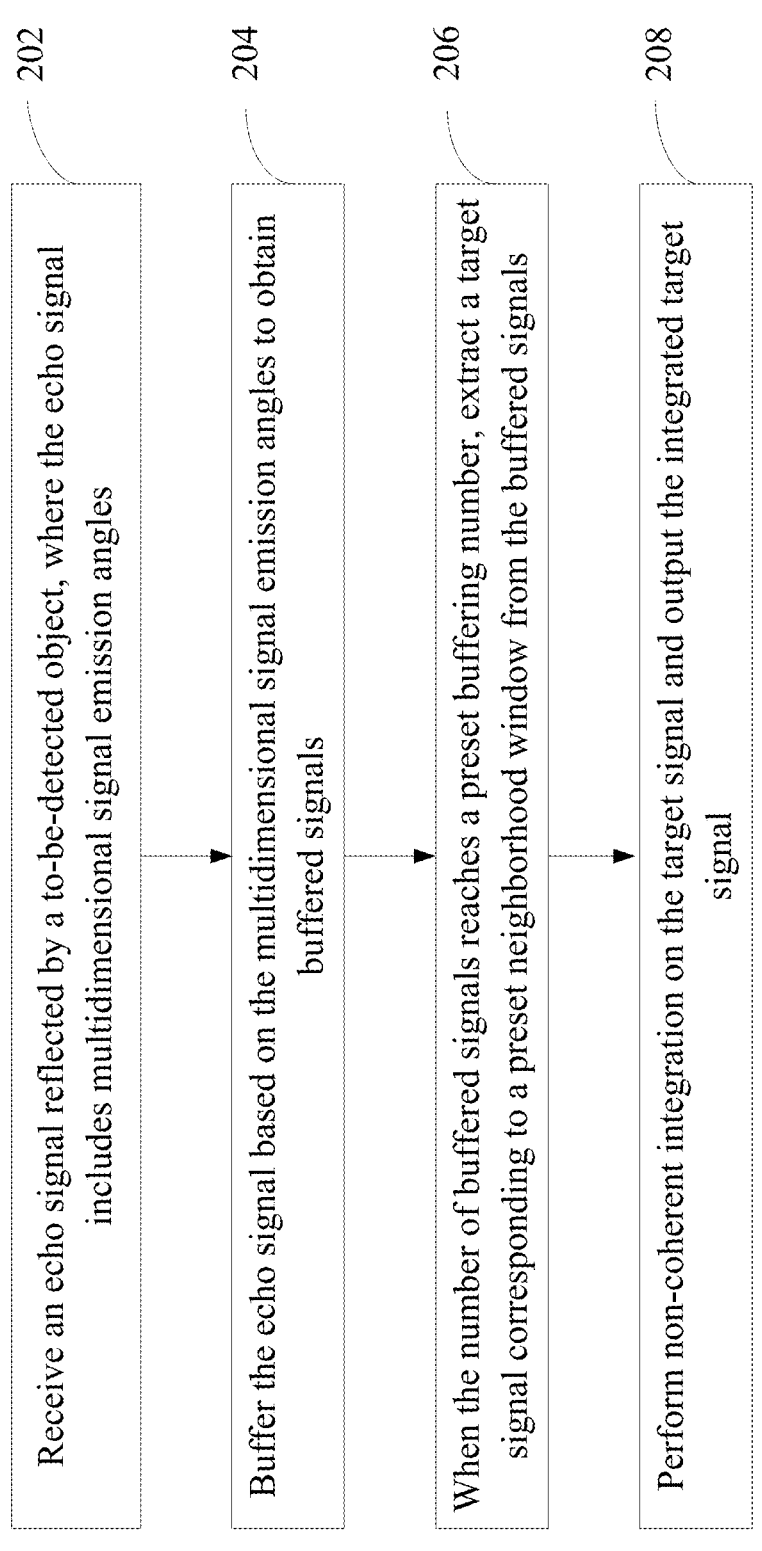

Receive an echo signal reflected by a to-be-detected object, where the echo signal includes multidimensional signal emission angles Buffer the echo signal based on the multidimensional signal emission angles to obtain buffered signals When the number of buffered signals reaches a preset buffering number, extract a target signal corresponding to a preset neighborhood window from the buffered signals Perform non-coherent integration on the target signal and output the integrated target signal

When the number of buffered signals reaches the preset buffering number, extract a history signal from the buffered signals based on the preset signal receiving sequence and a preset extraction number

302

Obtain a target signal corresponding to the preset neighborhood window based on the extracted history signal

304

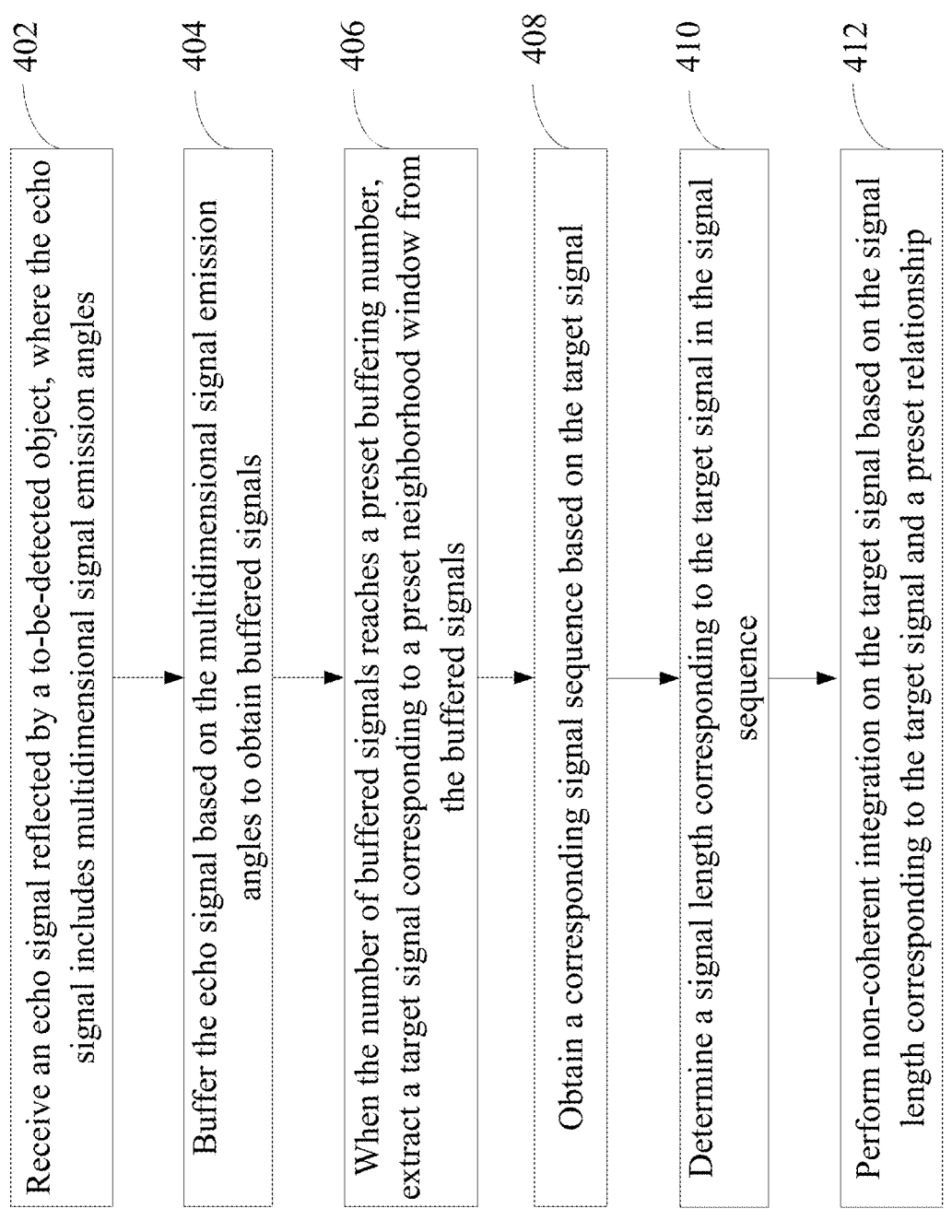

Receive an echo signal reflected by a to-be-detected object, where the echo signal includes multidimensional signal emission angles
— 402

Buffer the echo signal based on the multidimensional signal emission angles to obtain buffered signals
— 404

When the number of buffered signals reaches a preset buffering number, extract a target signal corresponding to a preset neighborhood window from the buffered signals
— 406

Obtain a corresponding signal sequence based on the target signal
— 408

Determine a signal length corresponding to the target signal in the signal sequence
— 410

Perform non-coherent integration on the target signal based on the signal length corresponding to the target signal and a preset relationship
— 412

FIG. 4

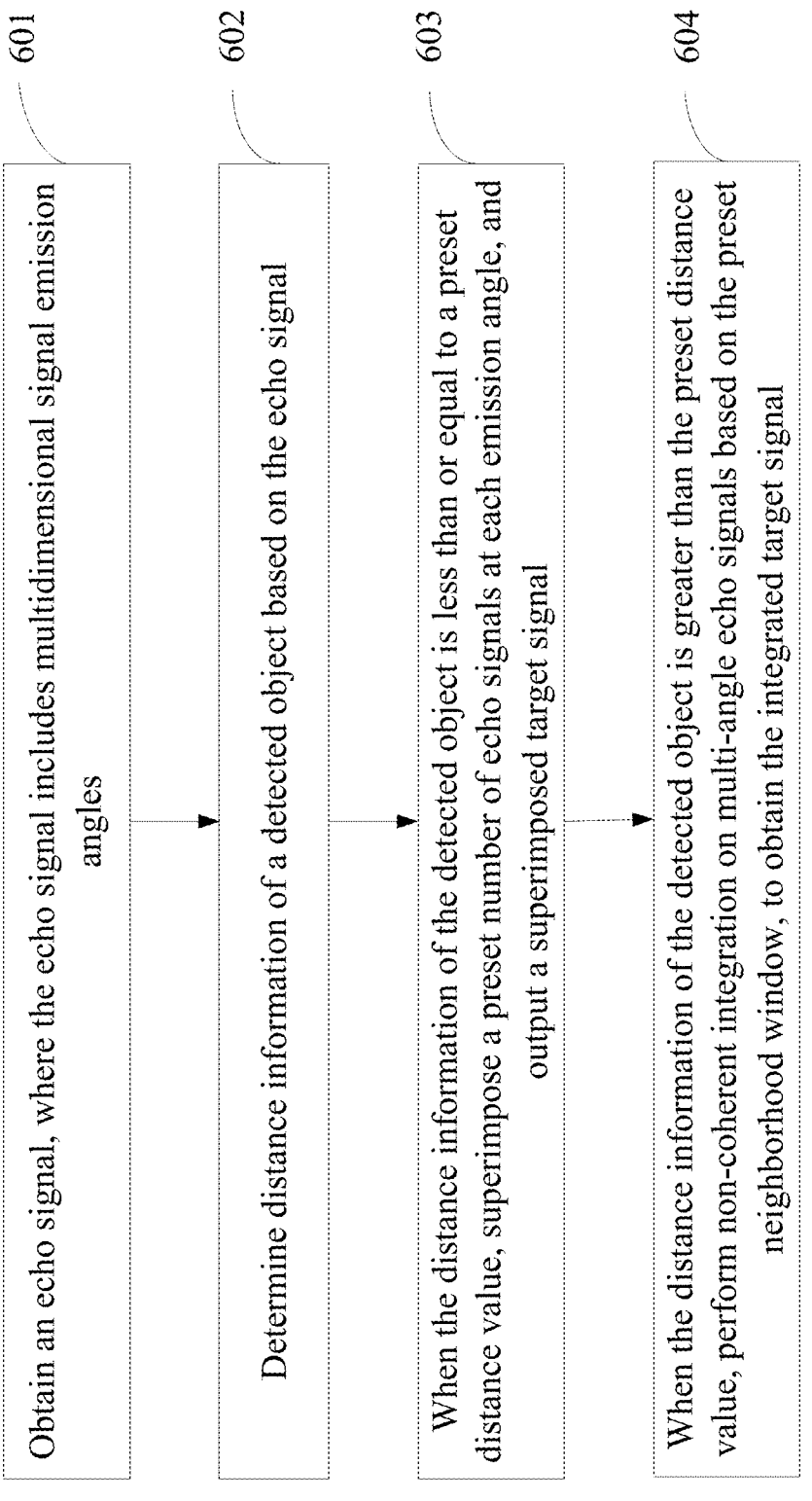

601

Obtain an echo signal, where the echo signal includes multidimensional signal emission angles

602

Determine distance information of a detected object based on the echo signal

603

When the distance information of the detected object is less than or equal to a preset distance value, superimpose a preset number of echo signals at each emission angle, and output a superimposed target signal

604

When the distance information of the detected object is greater than the preset distance value, perform non-coherent integration on multi-angle echo signals based on the preset neighborhood window, to obtain the integrated target signal

FIG. 6

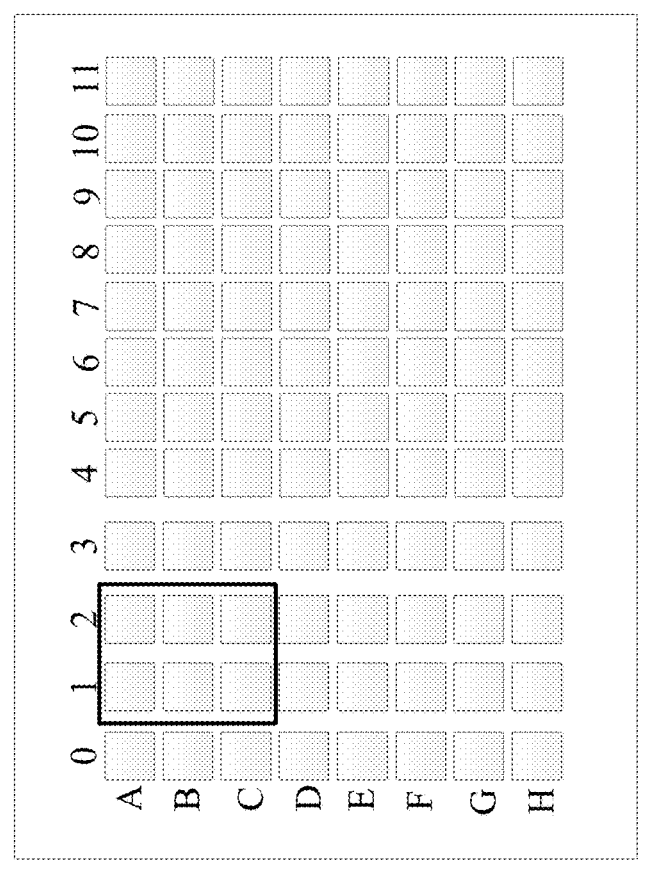
(b)
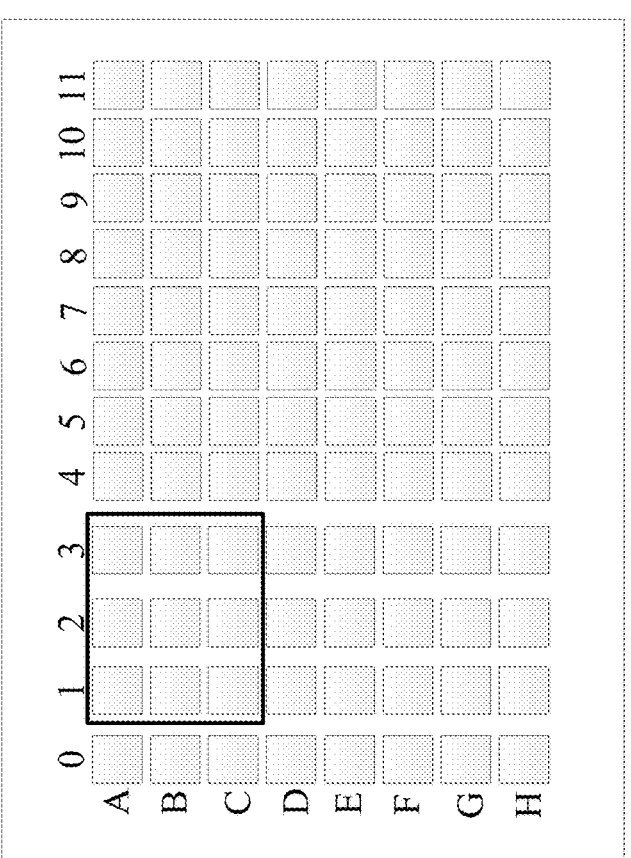
(a)
FIG. 6e

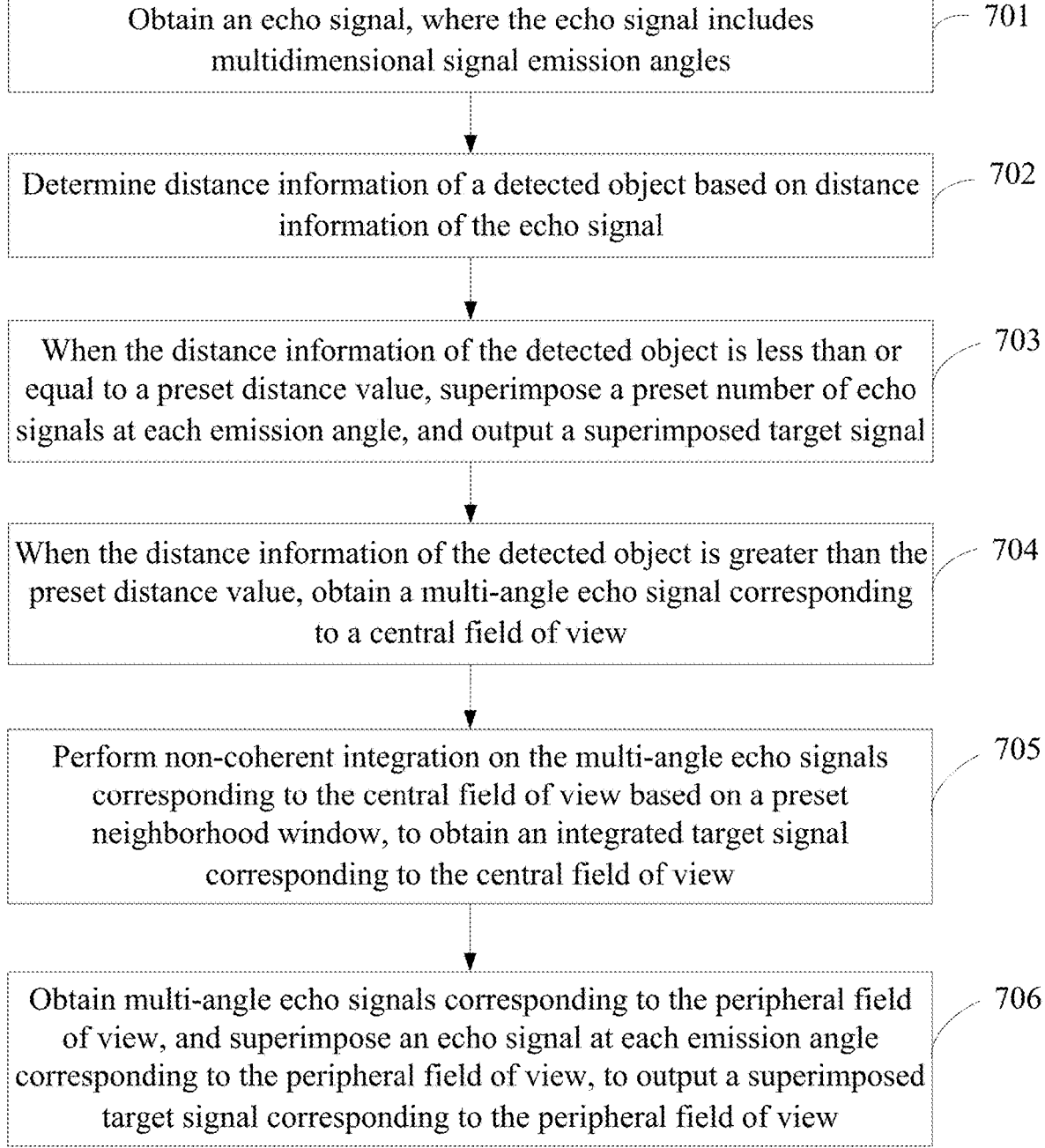

Obtain an echo signal, where the echo signal includes multidimensional signal emission angles — 701

Determine distance information of a detected object based on distance information of the echo signal — 702

When the distance information of the detected object is less than or equal to a preset distance value, superimpose a preset number of echo signals at each emission angle, and output a superimposed target signal — 703

When the distance information of the detected object is greater than the preset distance value, obtain a multi-angle echo signal corresponding to a central field of view — 704

Perform non-coherent integration on the multi-angle echo signals corresponding to the central field of view based on a preset neighborhood window, to obtain an integrated target signal corresponding to the central field of view — 705

Obtain multi-angle echo signals corresponding to the peripheral field of view, and superimpose an echo signal at each emission angle corresponding to the peripheral field of view, to output a superimposed target signal corresponding to the peripheral field of view — 706

FIG. 7

Peripheral field of view    Central field of view    Peripheral field of view

LIDAR ECHO SIGNAL PROCESSING METHOD AND DEVICE, COMPUTER DEVICE, AND STORAGE MEDIUM

CROSS-REFERENCE TO RELATED APPLICATION

The present application is a continuation-in-part of International Application No. PCT/CN2019/107880, filed on Sep. 25, 2019, which is incorporated herein by reference in its entirety.

TECHNICAL FIELD

This application relates to a LiDAR echo signal processing method and device, a computer device, and a storage medium.

BACKGROUND

LiDAR emits a detection signal to a to-be-detected object, and the detection signal is reflected when passing by the to-be-detected object. The echo signal reflected by the to-be-detected object is received, and then the echo signal is processed. As an important quality indicator in a signal processing procedure, a signal-to-noise ratio determines a ranging capability of the LiDAR. In a conventional method, the LiDAR echo signal is integrated through one-dimensional non-coherent integration to improve a signal-to-noise ratio of a LiDAR echo signal, thereby improving a ranging capability of the LiDAR echo signal.

However, the inventor finds that in the conventional method, when the echo signal reflected by a to-be-detected object with low reflectivity or at a long distance is non-coherently integrated, the signal-to-noise ratio of the LiDAR echo signal cannot be effectively improved, which causes a low ranging capability of the LiDAR echo signal.

SUMMARY

Embodiments disclosed in this application provide a LiDAR echo signal processing method and device, a computer device, and a storage medium, to effectively improve a signal-to-noise ratio of a LiDAR echo signal, thereby improving a ranging capability of the LiDAR echo signal.

According to a first aspect, this application discloses a LiDAR echo signal processing method, including:

receiving an echo signal reflected by a to-be-detected object, where the echo signal includes multidimensional signal emission angles;

buffering the echo signal based on the multidimensional signal emission angles to obtain buffered signals;

when the number of buffered signals reaches a preset buffering number, extracting a target signal corresponding to a preset neighborhood window from the buffered signals; and performing non-coherent integration on the target signal and outputting the integrated target signal.

According to a second aspect, this application discloses a LiDAR echo signal processing device, including:

a receiving module, configured to receive an echo signal reflected by a to-be-detected object, where the echo signal includes multidimensional signal emission angles;

a buffering module, configured to buffer the echo signal based on the multidimensional signal emission angles to obtain buffered signals;

an extraction module, configured to: when the number of buffered signals reaches a preset buffering number, extract a target signal corresponding to a preset neighborhood window from the buffered signals; and an integration module, configured to perform non-coherent integration on the target signal and output the integrated target signal.

According to a third aspect, this application discloses a computer device, including a memory and one or more processors, where the memory stores computer-readable instructions, and when executed by the processors, the computer-readable instructions enable the one or more processors to perform the following steps:

receiving an echo signal reflected by a to-be-detected object, where the echo signal includes multidimensional signal emission angles;

buffering the echo signal based on the multidimensional signal emission angles to obtain buffered signals;

when the number of buffered signals reaches a preset buffering number, extracting a target signal corresponding to a preset neighborhood window from the buffered signals; and performing non-coherent integration on the target signal and outputting the integrated target signal.

According to a fourth aspect, this application discloses one or more non-volatile computer-readable storage media storing computer-readable instructions, and when executed by one or more processors, the computer-readable instructions enable the one or more processors to perform the following steps:

receiving an echo signal reflected by a to-be-detected object, where the echo signal includes multidimensional signal emission angles;

buffering the echo signal based on the multidimensional signal emission angles to obtain buffered signals;

when the number of buffered signals reaches a preset buffering number, extracting a target signal corresponding to a preset neighborhood window from the buffered signals; and performing non-coherent integration on the target signal and outputting the integrated target signal.

According to a fifth aspect, this application discloses a LiDAR echo signal processing method, including:

obtaining an echo signal, where the echo signal includes multidimensional signal emission angles;

determining distance information of a detected object based on the echo signal; and when the distance information of the detected object is less than or equal to a preset distance value, superimposing a preset number of echo signals at each emission angle, and outputting a superimposed target signal; or when the distance information of the detected object is greater than the preset distance value, performing non-coherent integration on multi-angle echo signals based on the preset neighborhood window, to obtain the integrated target signal.

Optionally, after the obtaining an echo signal, the method further includes:

determining a preset memory corresponding to the echo signal based on the multidimensional signal emission angles and a signal receiving sequence of echo signals; and buffering the echo signal into the corresponding preset memory.

Optionally, before the performing non-coherent integration on multi-angle echo signals based on the preset neighborhood window, the method further includes:

obtaining a receiving sequence of multi-angle echo signals; and setting the preset neighborhood window based on the receiving sequence of multi-angle echo signals.

Optionally, before the performing non-coherent integration on multi-angle echo signals based on the preset neighborhood window, the method further includes:

obtaining similarity of echo data of close angles within the preset neighborhood window;
and when the similarity is greater than a preset threshold, performing non-coherent integration based on the preset neighborhood window, to obtain an integrated target signal; or when the similarity is less than or equal to the preset threshold, adjusting the preset neighborhood window based on a similarity value.

Optionally, when the distance information of the detected object is greater than the preset distance value, the performing non-coherent integration on multi-angle echo signals based on the preset neighborhood window, to obtain the integrated target signal includes:

when the distance information of the detected object is greater than the preset distance value, obtaining a multi-angle echo signal corresponding to a central field of view;

performing non-coherent integration on the multi-angle echo signals corresponding to the central field of view based on a preset neighborhood window, to obtain an integrated target signal corresponding to the central field of view;

obtaining multi-angle echo signals corresponding to the peripheral field of view; and superimposing an echo signal at each emission angle corresponding to the peripheral field of view, to output a superimposed target signal corresponding to the peripheral field of view.

According to a sixth aspect, a LiDAR echo signal processing device is disclosed and includes:

an obtaining module, configured to obtain an echo signal, where the echo signal includes multidimensional signal emission angles;

a determining module, configured to determine a distance of a detected object based on distance information of the echo signal;

a superimposition module, configured to: when the distance information of the detected object is less than or equal to a preset range, superimpose a preset number of echo signals at each emission angle, and output a superimposed target signal; and an integration module, configured to: when the distance information of the detected object is greater than the preset range, perform non-coherent integration on multi-angle echo signals based on the preset neighborhood window, to obtain the integrated target signal.

Optionally, the device further includes:

a storage module, configured to: determine a preset memory corresponding to the echo signal based on the multidimensional signal emission angles and a signal receiving sequence of echo signals; and buffer the echo signal into the corresponding preset memory.

Optionally, the device further includes a setting module, where the obtaining module is configured to obtain a receiving sequence of multi-angle echo signals; and the setting module is configured to set the preset neighborhood window based on the receiving sequence of multi-angle echo signals.

Optionally, the device further includes an adjustment module, where the obtaining module is further configured to obtain similarity of echo data of close angles within the preset neighborhood window;

the integration module is configured to: when the similarity is greater than a preset threshold, perform non-coherent integration based on the preset neighborhood window, to obtain an integrated target signal; and the adjustment module is configured to: when the similarity is less than or equal to the preset threshold, adjust the preset neighborhood window based on a similarity value.

Optionally, the obtaining module is further configured to: when the distance information of the detected object is greater than the preset range, obtain a multi-angle echo signal corresponding to a central field of view;

the integration module is further configured to perform non-coherent integration on the multi-angle echo signals corresponding to the central field of view based on a preset neighborhood window, to obtain an integrated target signal;

the obtaining module is further configured to obtain multi-angle echo signals corresponding to the peripheral field of view; and the superimposition module is further configured to superimpose an echo signal at each emission angle corresponding to the peripheral field of view, to output a superimposed target signal corresponding to the peripheral field of view.

In the LiDAR echo signal processing method provided in this application, the signal-to-noise ratio of the echo signal is improved, thereby improving the ranging capability of the LiDAR.

Details of one or more embodiments of this application are provided in the following accompanying drawings and descriptions. Other features and advantages of this application may be apparently inferred from this specification, accompanying drawings, and claims.

BRIEF DESCRIPTION OF THE DIAGRAMS

To describe the technical solutions in the embodiments of this application more clearly, the following briefly describes the accompanying drawings required in the embodiments. Obviously, the accompanying drawings in the following descriptions show merely some embodiments of this application, and a person of ordinary skill in the art may derive other drawings from these accompanying drawings without creative efforts.

FIG. 2 is a schematic flowchart of a LiDAR echo signal processing method according to one or more embodiments;

FIG. 4 is a schematic flowchart of a LiDAR echo signal processing method according to one or more embodiments;

FIG. 6 is a schematic flowchart of a LiDAR echo signal processing method according to one or more embodiments;

FIG. 6e is a schematic diagram of adjusting a preset neighborhood window according to one or more embodiments;

FIG. 7 is a schematic flowchart of a LiDAR echo signal processing method according to one or more embodiments;

DESCRIPTION OF THE INVENTION

To make the technical solutions and advantages of this application more comprehensible, the following further describes this application in detail with reference to accompanying drawings and the embodiments. It should be understood that the specific embodiments described herein are merely used to explain this application but are not intended to limit this application.

Figure 1:
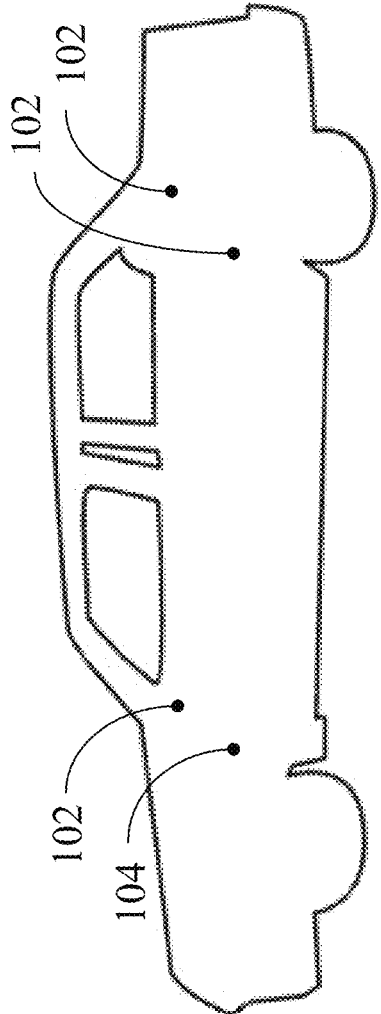
FIG. 1 is a diagram of an application scenario of a LiDAR echo signal processing method according to one or more embodiments.

A LiDAR echo signal processing method provided in this application may be applied to an application environment shown in FIG. 1. The LiDAR 102 emits a detection signal, and after the detection signal reaches a to-be-detected object, an echo signal is reflected. The LiDAR may be a solid-state LiDAR. The LiDAR 102 receives the echo signal reflected by the to-be-detected object through the receiver, and the receiver may be a silicon photomultiplier (SiPM). The LiDAR 102 sends the echo signal to a computer device 104, and the echo signal includes multidimensional signal emission angles. The computer device 104 buffers the echo signal based on the multidimensional signal emission angles to obtain buffered signals. When the number of buffered signals reaches a preset buffering number, the computer device 104 extracts a target signal corresponding to a preset neighborhood window from the buffered signals. The computer device 104 selects an echo signal processing policy based on echo signal information, to obtain a target signal.

Herein, it should be understood that all or a part of the computer device 104 may be integrated inside the LiDAR 102, or may exist independently of the LiDAR 102.

The LiDAR 102 may include a Micro-Electro-Mechanical Systems (MEMS) solid-state LiDAR or a flash LiDAR. The embodiments of this application impose no limitation on a specific type of the LiDAR or a mounting position and number of the LiDAR.

In an embodiment, as shown in FIG. 2, a LiDAR echo signal processing method is provided. An example in which the method is applied to the computer device in FIG. 1 is used for description. The method includes the following steps:

Step 202: Receive an echo signal reflected by a to-be-detected object, where the echo signal includes multidimensional signal emission angles.

The LiDAR emits a detection signal. After the detection signal reaches the to-be-detected object, the echo signal is reflected, and the LiDAR receives the echo signal through the receiver. The computer device receives the echo signal sent by the LiDAR. The echo signals may include a preamble signal, a valid echo signal, a false echo signal, and ambient noise. The echo signal includes multidimensional signal emission angles. The multidimensional signal emission angles may include a pitch angle and a yaw angle. A same pitch angle may correspond to a plurality of yaw angles, and a same yaw angle may also correspond to a plurality of pitch angles. Different signal emission angles can correspond to emission and receiving of independent signals, that is, different detection signals and echo signals. The number of signal emission angles may be determined based on monoscopic resolution of the LiDAR. For example, the monoscopic resolution of a solid-state LiDAR is 76×250, and the solid-state LiDAR can include 76 pitch angles and 250 yaw angles. The echo signals at the multidimensional signal emission angles can be obtained by the LiDAR by scanning a visible range and adjusting an emission angle of the detection signal. A LiDAR may first maintain the pitch angle and adjust the yaw angle for emitting the detection signal. When the yaw angle reaches a limit of the angle range, the LiDAR adjusts the pitch angle, and then adjusts the yaw angle for subsequently emitting a detection signal in a direction opposite to that of the last emitted detection signal, so that the echo signals at the multidimensional signal emission angles can be obtained.

In an embodiment, before buffering the echo signals based on the multidimensional signal emission angles, the method further includes: amplifying the received echo signal to obtain an amplified echo signal; performing analog-to-digital conversion on the amplified echo signal to obtain a converted digital signal; and filtering the converted digital signal.

The computer device amplifies the echo signal, to amplify the weak echo signal for subsequent signal processing. The computer device performs analog-to-digital conversion on the amplified echo signal to non-coherently integrate the echo signal. The computer device filters a converted digital signal. The filtering may be removing a direct current component from the echo signal, and a method for removing the direct current component may be using a high-pass filter for filtering. The computer device filters the converted digital signal, thereby avoiding interference from the direct current component.

Step 204: Buffer the echo signal based on the multidimensional signal emission angles to obtain buffered signals.

Step 206: When the number of buffered signals reaches a preset buffering number, extract a target signal corresponding to a preset neighborhood window from the buffered signals.

Step 208: Perform non-coherent integration on the target signal and output the integrated target signal.

After receiving the echo signal, the computer device can buffer the echo signal based on the multidimensional signal emission angles. Specifically, the echo signal received by the computer device may also include a signal receiving sequence. The computer device is preconfigured with a plurality of memories. The computer device determines a preset memory corresponding to the echo signal based on the multidimensional signal emission angles and a signal receiving sequence. Further, the computer device buffers the echo signal into a determined preset memory.

After the computer device buffers the echo signal, the buffered signal is obtained. The computer device determines whether the number of buffered signals reaches a preset buffering number. The preset buffering number may be determined by the computer device based on an emission angle of the LiDAR. For example, the LiDAR can cover 76 pitch angles and 250 yaw angles. The preset buffering number may be 3×250.

When the number of buffered signals in the computer device reaches the preset buffering number, the computer device extracts a target signal corresponding to the preset neighborhood window from the buffered signals. For example, a size of the preset neighborhood window may be 3×3. The preset neighborhood window may be a sliding window.

The computer device performs non-coherent integration on the target signal of the preset neighborhood window. For example, when the size of the preset neighborhood window is 3×3, the computer device extracts a total of 9 echo signals, namely 1st to 3rd echo signals, 251st to 253rd echo signals, and 501st to 503rd echo signals, from the buffered echo signals as target signals. The computer device performs non-coherent integration on 9 target signals corresponding to the preset neighborhood window, and initial phases between the echo signals to be non-coherently integrated may be random and uncorrelated. The non-coherent integration may be integrating the echo signals in a case where phase information of the echo signals is lost, thereby improving the signal-to-noise ratio of the echo signals.

In a conventional method, the echo signal is integrated through one-dimensional non-coherent integration in a yaw angle direction. When a to-be-detected object has relatively low reflectivity or is relatively distant, the signal-to-noise ratio of the echo signal cannot be effectively improved, which causes a relatively low ranging capability of the echo signal. However, in this embodiment, the computer device receives the echo signals at the multidimensional signal emission angles, to improve an amount of non-coherent integration of signals through spatial correlation between the echo signals at the multidimensional signal emission angles. The computer device extracts the target signal corresponding to the preset neighborhood window from the buffered echo signals when the number of buffered echo signals reaches the preset buffering number, thereby improving correlation between target signals. The computer device performs non-coherent integration on the target signal corresponding to the preset neighborhood window, which can increase the amount of integration of the signal when the phase of the target signal is lost, thereby improving the signal-to-noise ratio of the echo signal and further effectively improving the ranging capability of the echo signal.

In an embodiment, buffering the echo signals based on the multidimensional signal emission angles includes: determining a preset memory corresponding to the echo signal based on the multidimensional signal emission angles and a signal receiving sequence of echo signals; and buffering the echo signal into the corresponding preset memory.

The echo signal received by the computer device may include a signal receiving sequence. The signal receiving sequence may be an emission sequence number corresponding to the echo signal, or may be an emission moment corresponding to the echo signal. The computer device may be preconfigured with a plurality of memories. The plurality of memories can store a same number of echo signals. Each memory has corresponding storage capacity. The number of echo signals stored in each memory may be less than or equal to the storage capacity. The multidimensional signal emission angles may include a pitch angle and a yaw angle. A same pitch angle may correspond to a plurality of yaw angles, and a same yaw angle may also correspond to a plurality of pitch angles. The computer device may store a plurality of echo signals with the same pitch angle and different yaw angles into a corresponding memory. The computer device adjusts the pitch angle of the LiDAR, maintains the adjusted pitch angle, and then adjusts a yaw angle of the LiDAR in a direction opposite to that of the last emitted detection signal, to obtain the echo signal corresponding to the adjusted pitch angle. The computer device stores the echo signal corresponding to the adjusted pitch angle in another memory.

In an embodiment, the multidimensional signal emission angles include a first emission angle and a second emission angle, and the foregoing method further includes: arranging a plurality of preset memories into a plurality of storage rows, where each preset memory corresponds to one storage row; and each preset memory is configured to store echo signals at the same first emission angle that correspond to a preset receiving sequence; and correspondingly arranging storage columns of the plurality of preset memories to obtain a plurality of matrix columns, where each matrix column is used to store the echo signals at the same second emission angle.

The computer device correspondingly arranges a plurality of preset memories, and a storage row of each preset memory may store the echo signals at the same first emission angle that correspond to the preset receiving sequence. The preset memory stores echo signals at the same second emission angle in the same matrix column generated by storage columns of the plurality of preset memories. The first emission angle may be the pitch angle. The second emission angle may be the yaw angle. This facilitates subsequent signal extraction.

For example, the computer device may be preconfigured with three memories: the first memory, the second memory, and the third memory. The computer device buffers 1st to 250th echo signals in the first memory, and the 1st to 250th echo signals may have the same pitch angle and different yaw angles. The computer device buffers 251st to 500th echo signals in the second memory, and the 251st to 500th echo signals may have the same pitch angle and different yaw angles. The computer device buffers 501st to 750th echo signals in the third memory, and the 500st to 750th echo signals may have the same pitch angle and different yaw angles. The first echo signal, the 251st echo signal, and the 501st echo signal may have different pitch angles and same yaw angles.

Herein, in an optional embodiment, before performing non-coherent integration on the target signal, the method further includes: obtaining similarity of echo data of close angles within the preset neighborhood window; and when the similarity is greater than a preset threshold, performing non-coherent integration based on the preset neighborhood window, to obtain an integrated target signal; or when the similarity is less than or equal to the preset threshold, adjusting the preset neighborhood window based on a similarity value.

Herein, it can be understood that when similarity is calculated, a difference between echo areas of close data may be used as a determining basis; a difference between echo start moments of close data may further be used as the determining basis; or both the difference between the echo areas and the difference between the echo start moments may be used as the determining basis. Based on different distance scenarios, a threshold Th_Area is set for the difference between different echo areas, and a threshold Th_start is set for the difference between different echo start moments. Herein, it can be understood that the farther the distance is, the greater the threshold Th_Area is set for the difference between the echo areas, and the farther the distance is, the greater the threshold Th_start is set for the difference between different echo start moments. When both the difference between the echo areas and the difference between the echo start moments are used as the determining basis, if the difference between the echo areas of the close data is less than or equal to Th_Area and the difference between the echo start moments of the close data is less than or equal to Th_start, this indicates that the close data is similar, otherwise, this indicates that the close data is not similar.

Herein, in an optional embodiment, when the similarity is less than or equal to the preset threshold, adjusting the preset neighborhood window based on the similarity value includes: when it is determined that a total similarity value of the corresponding echo signals in the preset neighborhood window is less than the preset threshold, calculating similarity of any two close echo signals in the preset neighborhood window separately, to determine echo signals with a similarity value different from that of other echo signals within the preset neighborhood window; and based on angle information of the determined echo signals with the similarity value different from that of other echo signals in the preset neighborhood window, adjusting the preset neighborhood window, so that the similarity value of the echo signals included in the preset neighborhood window is greater than the preset threshold.

For example, FIG. 6e shows a specific adjustment process of the preset neighborhood window. As shown in FIG. 6e(a), an initial preset neighborhood window includes echo signals such as A1, A2, A3, B1, B2, B3, C1, C2, and C3, similarity of the echo signals such as A1, A2, A3, B1, B2, B3, C1, C2, and C3 in the initial preset neighborhood window is determined, and if the similarity of A3, B3, and C3 does not meet a preset requirement, the preset neighborhood window is adjusted in a manner shown in FIG. 6e(b).

In this embodiment, the computer device stores the echo signals in the corresponding preset memory based on the multidimensional signal emission angles and the signal receiving sequence of the echo signals, to correspondingly store the echo signals with better correlation based on a spatial relationship of close detection signals in a pitch angle direction and a yaw angle direction, thereby facilitating extraction of the target signal.

Figure 3:
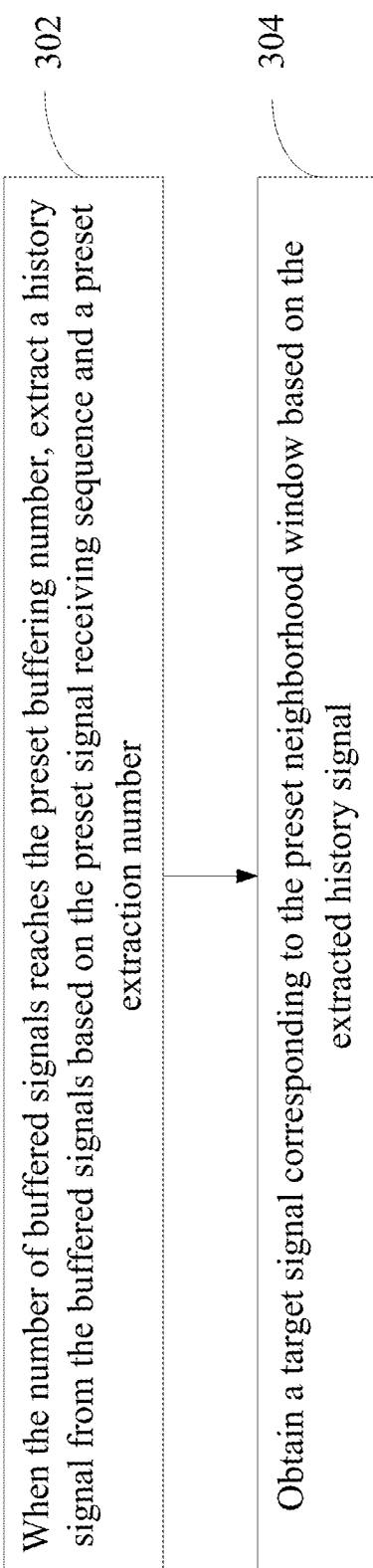
FIG. 3 is a schematic flowchart of a step of extracting a target signal corresponding to a preset neighborhood window from buffered signals when the number of buffered signals reaches a preset buffering number according to one or more embodiments.

In an embodiment, as shown in FIG. 3, the method further includes a step of extracting a target signal corresponding to a preset neighborhood window from buffered signals when the number of buffered signals reaches a preset buffering number, and specifically includes the following steps:

Step 302: When the number of buffered echo signals reaches the preset buffering number, extract a history signal from the buffered signals based on the preset signal receiving sequence and a preset extraction number.

Step 304: Obtain a target signal corresponding to the preset neighborhood window based on the extracted history signal.

After the computer device buffers the echo signal based on the multidimensional signal emission angles, the buffered signals are obtained. The computer device determines whether the number of buffered signals reaches the preset buffering number, and when the number of buffered signals reaches the preset buffering number, the target signal corresponding to the preset neighborhood window is extracted. The preset neighborhood window may include the preset signal receiving sequence and the preset extraction number. The preset signal receiving sequence may indicate that the echo signals are earlier in the signal receiving sequence in the plurality of preset memories corresponding to the buffered signals. The preset extraction number may indicate that three echo signals are extracted from each preset memory, that is, a total of 9 echo signals. The computer device extracts three history signals with an earlier signal receiving sequence from each preset memory, and uses the extracted three history signals as the target signals corresponding to the preset neighborhood window. For example, the computer device extracts a total of 9 history signals, namely 1st to 3rd history signals, 251st to 253rd history signals, and 501st to 503rd history signals, from the buffered signals as the target signals.

In an embodiment, the method further includes: determining the number of storage rows of the preset neighborhood window based on the number of storage rows corresponding to the plurality of preset memories, where each storage row of the preset neighborhood window is used to store the buffered signals in the preset signal receiving sequence that is extracted from the preset memory; and based on the storage column of the plurality of preset memories, correspondingly storing the buffered signals stored in the storage row of the preset neighborhood window.

The number of storage rows of the preset neighborhood window in the computer device may be the same as the number of storage rows corresponding to the preset memory. Each storage row of the preset neighborhood window is used to store the buffered signals in the preset signal receiving sequence that is extracted from the preset memory. Each storage row of the preset neighborhood window can store buffered signals with the same pitch angle. The number of storage columns of the preset neighborhood window may be preset. The storage column of the preset neighborhood window can be used to store the buffered signals with the same yaw angle, and a difference between the buffered signals in close space is one preset emission period.

For example, when the preset buffering number is 3×250, a size of the preset neighborhood window may be 3×3. The preset signal receiving sequence may be extracting three buffered signals with the earliest signal receiving sequence from each memory. The preset extraction number may be 9. The computer device uses the 9 extracted buffered signals as the target signals corresponding to the preset neighborhood window.

In this embodiment, the computer device extracts the history signals from the buffered signals based on the preset extraction sequence and the preset extraction number, to obtain the target signal corresponding to the preset neighborhood window and extract the history signals with better correlation, thereby increasing the amount of non-coherent integration and further improving the ranging capability of the echo signals.

In an embodiment, as shown in FIG. 4, a LiDAR echo signal processing method is provided.

An example in which the method is applied to the computer device is used for description. The method includes the following steps:

Step 402: Receive an echo signal reflected by a to-be-detected object, where the echo signal includes multidimensional signal emission angles.

Step 404: Buffer the echo signal based on the multidimensional signal emission angles to obtain buffered signals.

Step 406: When the number of buffered signals reaches a preset buffering number, extract a target signal corresponding to a preset neighborhood window from the buffered signals.

Step 408: Obtain a corresponding signal sequence based on the target signal.

Step 410: Determine a signal length corresponding to the target signal in the signal sequence.

Step 412: Perform non-coherent integration on the target signal based on the signal length corresponding to the target signal and a preset relationship.

After extracting the target signal corresponding to the preset neighborhood window, the computer device obtains the corresponding signal sequence based on the target signal. The signal sequence may be a pulse sequence obtained after the echo signal is maintained at specific frequency. The signal sequence may be a distance gate. The computer device determines a signal length corresponding to the target signal in the signal sequence. The signal length may be an amplitude of the target signal. A data length of the echo signal is L, the signal length corresponding to the target signal is n, and a value range of n may be [1, L]. Further, the computer device performs non-coherent integration on the target signal based on the signal length and the preset relationship. The preset relationship may be a calculation formula for non-coherent integration. For example, when the number of extracted target signals is 9, a calculation formula may be as follows:

$$y[n] = \sum_{i=1}^{9} x_i[n], \ n \square [1:L]$$

Herein, y[n] represents an integrated target signal, n represents the signal length of each target signal, i represents the number of target signals, and L represents the data length of the echo signal.

In this embodiment, the computer device receives the echo signals at the multidimensional signal emission angles, to improve an amount of non-coherent integration of signals through spatial correlation between the echo signals at the multidimensional signal emission angles. The computer device extracts the target signal corresponding to the preset neighborhood window from the buffered signals when the number of buffered signals reaches the preset buffering number, thereby improving correlation between target signals. The computer device obtains the signal sequence corresponding to the target signal, determines the signal length corresponding to the target signal from the signal sequence, and then performs non-coherent integration on the target signal based on the preset relationship, so that signal lengths of the plurality of target signals in the same signal sequence can be integrated, thereby further improving the signal-to-noise ratio of the echo signal and further improving the ranging capability of the echo signals.

In an embodiment, the echo signal includes a signal receiving sequence, and the foregoing method further includes: when the number of received echo signals exceeds the preset buffering number, using echo signals outnumbered in comparison with the buffering number as to-be-processed signals; determining a first signal corresponding to a next preset emission period based on an earliest echo signal in a signal receiving sequence in the buffered signals, and overwriting the earliest echo signal in the signal receiving sequence based on the first signal; determining a second signal corresponding to the next preset emission period based on the first signal in the buffered signals, and overwriting the first signal based on the second signal; re-performing the step of overwriting a signal in the buffered signals, and overwriting a buffered signal in the previous preset emission period with a buffered signal in the current preset emission period in the buffered signals until a corresponding buffered signal in the previous preset emission period is overwritten with the to-be-processed signal; and extracting the target signal corresponding to the preset neighborhood window from the overwritten buffered signal.

After the number of buffered signals reaches the preset number, the computer device may overwrite the buffered signals in the preset memory. Specifically, the computer device is pre-configured with a plurality of memories, and the computer device uses the echo signals outnumbered in comparison with the buffering number as the to-be-processed signals. Each memory can store an echo signal in a preset emission period. In a preset emission period, 250 echo signals may be emitted. The echo signals received by the computer device include a signal receiving sequence. The computer device may first identify the first signal in the next preset emission period corresponding to the earliest echo signal in the signal receiving sequence in the plurality of preset memories, and overwrite the earliest echo signal in the signal receiving sequence at a signal position in the memory with the first signal. The computer device identifies the second signal in the next preset emission period corresponding to the first signal in the plurality of preset memories, and overwrites the first signal at the signal position in the memory with the second signal. The computer device re-performs the foregoing step of overwriting a signal, and overwrites a buffered signal in the previous preset emission period with a buffered signal in the current preset emission period in the buffered signals until a corresponding buffered signal in the previous preset emission period of the to-be-processed signal in the buffered signals is overwritten with the to-be-processed signal. After completing overwriting the signal, the computer device extracts the target signal corresponding to the preset neighborhood window from the overwritten buffered signal. The preset neighborhood window may be a sliding neighborhood window. When the size of the preset neighborhood window is 3×3, the computer device may extract 502nd to 504th buffered signals, 252nd to 254th buffered signals, and 2nd to 4th buffered signals from the overwritten buffered signals to perform non-coherent integration.

After the buffered signals in the preset memory are overwritten, the preset neighborhood window may also slide correspondingly. The preset neighborhood window includes a storage row and a storage column. The number of storage rows may be equal to the number of preset memories. Each storage row of the preset neighborhood window may include three memories, namely a first neighborhood memory, a second neighborhood memory, and a third neighborhood memory. The computer device reads a signal stored in the first neighborhood memory and writes it into the second memory. The computer device reads the earliest signal in the signal receiving sequence in the second memory, and writes it into the third memory. The first memory extracts the next echo signal from the preset memory for storage. In this case, signals stored in the preset neighborhood window are the 502nd to 504th buffered signals, 252nd to 254th buffered signals, and 2nd to 4th buffered signals.

The following diagram is a schematic structural diagram of overwriting a buffered signal in a preset memory and extracting a target signal in the preset neighborhood window from the overwritten buffered signal.

| The 750th echo signals | | | | | | | | |
|---|---|---|---|---|---|---|---|---|
| line_ram1 | 750 | 749 | 748 | . . . | 504 | 503 | 502 | 501 |

-continued

| | | | | | | | | |
|---|---|---|---|---|---|---|---|---|
| line_ram2 | 500 | 499 | 498 | . . . | 254 | 253 | 252 | 251 |
| line_ram3 | 250 | 249 | 248 | . . . | 4 | 3 | 2 | 1 |
| | | | The 751th echo signals | | | | | |
| line_ram1 | 750 | 749 | 748 | . . . | 504 | 503 | 502 | 751 |
| line_ram2 | 500 | 499 | 498 | . . . | 254 | 253 | 252 | 501 |
| line_ram3 | 250 | 249 | 248 | . . . | 4 | 3 | 2 | 251 |

Herein, line_ram1 represents the third memory, line_ram2 represents the second memory, and line_ram3 represents the first memory. A signal in the black box may be the signal in the preset neighborhood window that is extracted from the buffered signal.

For example, the computer device may be preconfigured with three memories: the first memory, the second memory, and the third memory. In one preset emission period, 250 echo signals are buffered. The computer device buffers 1st to 250th echo signals in the first memory, buffers the 251st to 500th echo signals in the second memory, and buffers the 501st to 750th echo signals in the third memory. When the computer device receives the 751st echo signal, the number of echo signals received by the computer device exceeds the preset buffering number of 750. The earliest echo signal in the signal receiving sequence in the memory is the first echo signal. The computer device first identifies the 251st echo signal corresponding to the first echo signal in the three memories, and overwrites the first echo signal at the signal position in the first memory with the 251st echo signal. The computer device identifies the 501st echo signal corresponding to the 251st echo signal in the three memories, and overwrites the 251st echo signal at the signal position in the second memory with the 501st echo signal. The computer device overwrites the 501st echo signal at the signal position in the third memory with the received 751st echo signal. When the size of the preset neighborhood window is 3×3, the computer device may extract 502nd to 504th buffered signals, 252nd to 254th buffered signals, and 2nd to 4th buffered signals from the overwritten buffered signals to perform non-coherent integration.

For another example, when the computer device receives the 752nd echo signal, the earliest echo signal in the signal receiving sequence in the memory is the second echo signal. The computer device first identifies the 252nd echo signal corresponding to the second echo signal in the three memories, and overwrites the second echo signal at the signal position in the first memory with the 252nd echo signal. The computer device identifies the 502nd echo signal corresponding to the 252nd echo signal in the three memories, and overwrites the 252nd echo signal at the signal position in the second memory with the 502nd echo signal. The computer device overwrites the 502nd echo signal at the signal position in the third memory with the received 752nd echo signal. When the size of the preset neighborhood window is 3×3, the computer device may extract 502nd to 504th buffered signals, 252nd to 254th buffered signals, and 2nd to 4th buffered signals from the overwritten buffered signals to perform non-coherent integration.

In this embodiment, when the number of received echo signals exceeds the preset buffering number, the computer device overwrites the buffered signals corresponding to echo signals outnumbered in comparison with the buffering number, and extracts the target signal in the preset neighborhood window from the overwritten buffered signals. This facilitates the non-coherent integration of the target signal, and can further improve the signal-to-noise ratio of the echo signal.

Figure 5:
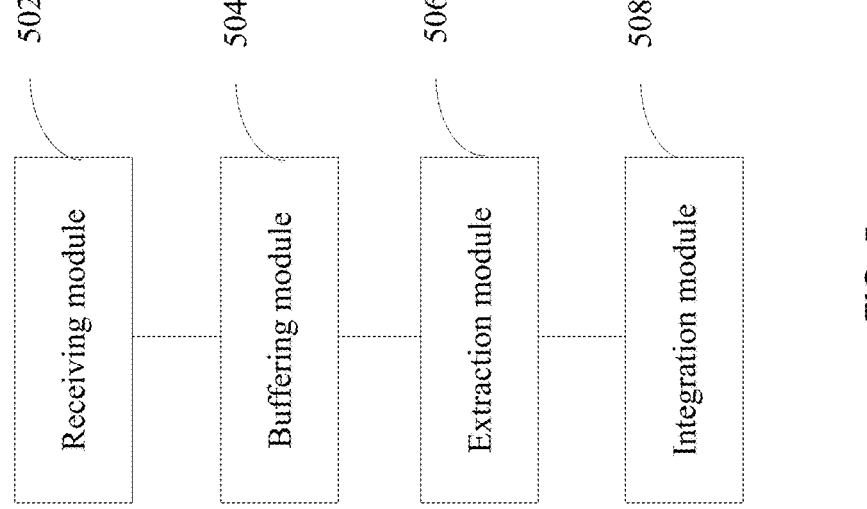
FIG. 5 is a block diagram of a LiDAR echo signal processing device according to one or more embodiments.

It should be understood that although the steps in the flowcharts in FIG. 1 to FIG. 4 are shown in sequence as indicated by the arrows, these steps are not necessarily executed in the sequence indicated by the arrows. Unless explicitly described herein, an execution sequence of these steps is not strictly limited, and these steps may be performed in another sequence. In addition, at least some steps in FIG. 1 to FIG. 4 may include a plurality of sub-steps or phases. These sub-steps or phases are not necessarily executed and completed synchronously, but may be executed asynchronously. These sub-steps or phases are not necessarily performed in sequence, but may be performed alternately with at least some of other steps, sub-steps of the other steps, or the phases. In an embodiment, as shown in FIG. 5, a LiDAR echo signal processing device is provided, and includes: a receiving module 502, a buffering module 504, an extraction module 506, and an integration module 508.

The receiving module 502 is configured to receive an echo signal reflected by a to-be-detected object, where the echo signal includes multidimensional signal emission angles.

The buffering module 504 is configured to buffer the echo signal based on the multidimensional signal emission angles to obtain buffered signals.

The extraction module 506 is configured to: when the number of buffered signals reaches a preset buffering number, extract a target signal corresponding to a preset neighborhood window from the buffered signals.

The integration module 508 is configured to perform non-coherent integration on the target signal and output the integrated target signal.

In an embodiment, the buffering module 504 is further configured to determine a preset memory corresponding to the echo signal based on the multidimensional signal emission angles and a signal receiving sequence of echo signals; and buffer the echo signals into the corresponding preset memory.

In an embodiment, the device further includes: an arrangement module, configured to arrange a plurality of preset memories into a plurality of storage rows, where each preset memory corresponds to one storage row; and each preset memory is configured to store echo signals at the same first emission angle that correspond to a preset receiving sequence; and correspondingly arrange storage columns of the plurality of preset memories to obtain a plurality of matrix columns, where each matrix column is used to store the echo signals at the same second emission angle.

In an embodiment, the extraction module 506 is further configured to: when the number of buffered signals reaches the preset buffering number, extract a history signal from the buffered signals based on the preset signal receiving sequence and a preset extraction number; and obtain a target signal corresponding to the preset neighborhood window based on the extracted history signal.

In an embodiment, the device further includes: a determining module, configured to determine the number of storage rows of the preset neighborhood window based on the number of storage rows corresponding to the plurality of preset memories, where each storage row of the preset neighborhood window is used to store the buffered signals in the preset signal receiving sequence that is extracted from the preset memory; and based on the storage column of the plurality of preset memories, correspondingly store the buffered signals stored in the storage row of the preset neighborhood window.

In an embodiment, the integration module 508 is further configured to obtain a corresponding signal sequence based on the target signal; determine a signal length corresponding to the target signal in the signal sequence; and perform non-coherent integration on the target signal based on the signal length corresponding to the target signal and a preset relationship.

In an embodiment, the device further includes: a preprocessing module, configured to amplify the received echo signal to obtain an amplified echo signal; perform analog-to-digital conversion on the amplified echo signal to obtain a converted digital signal; and filter the converted digital signal.

In an embodiment, the device further includes: an overwriting module, configured to: when the number of received echo signals exceeds the preset buffering number, use echo signals outnumbered in comparison with the buffering number as to-be-processed signals; determine a first signal corresponding to a next preset emission period based on an earliest echo signal in a signal receiving sequence in the buffered signals, and overwrite the earliest echo signal in the signal receiving sequence based on the first signal; determine a second signal corresponding to the next preset emission period based on the first signal in the buffered signals, and overwrite the first signal based on the second signal; re-perform the step of overwriting a signal in the buffered signals, and overwrite a buffered signal in the previous preset emission period with a buffered signal in the current preset emission period among the buffered signals until a corresponding buffered signal in the previous preset emission period is overwritten with the to-be-processed signal; and extract the target signal corresponding to the preset neighborhood window from the overwritten buffered signal.

For a specific limitation on the LiDAR echo signal processing device, refer to a limitation on the LiDAR echo signal processing method above. Details are not described herein again. Each module in the foregoing LiDAR echo signal processing device may be implemented completely or partially through software, hardware, and a combination thereof. The foregoing modules may be embedded in or independent of a processor in the computer device in the form of hardware, or stored in the memory in the computer device in the form of software, to be invoked by the processor to perform operations corresponding to the foregoing modules.

In an embodiment, referring to FIG. 6, FIG. 6 is a schematic flowchart of a LiDAR echo signal processing method according to an embodiment of this application. The method includes the following steps:

S601. Obtain an echo signal, where the echo signal includes multidimensional signal emission angles.

Herein, the echo signal may be obtained based on a scanning mode of the LiDAR.

Specifically, different types of LiDAR use different methods for scanning point cloud data. A MEMS LiDAR performs scanning through a simple harmonic motion of a mirror, and therefore, an optical scanning path can implement, for example, a scanning field of view with a slow axis reciprocating from top to bottom and a fast axis reciprocating from left to right in a spatial sequence. For another example, a flash LiDAR performs scanning in a fast-scanning manner through a transmitter based on preset control logic. For another example, a mechanical LiDAR performs scanning by driving an optical system to rotate 360 degrees through a mechanical drive device, to form a cylindrical detection region with the LiDAR as the center.

The LiDAR emits a detection laser. After the detection laser reaches the to-be-detected object, the echo signal is reflected, and the LiDAR receives the echo signal through the receiver. The computer device receives the echo signal sent by the LiDAR. The echo signals may include a pre-amble signal, a valid echo signal, a false echo signal, and ambient noise. The echo signal includes multidimensional signal emission angles. The multidimensional signal emission angles may include a pitch angle and a yaw angle. A same pitch angle may correspond to a plurality of yaw angles, and a same yaw angle may also correspond to a plurality of pitch angles. Different signal emission angles can correspond to emission and receiving of independent signals, that is, different detection signals and echo signals. The number of signal emission angles may be determined based on monoscopic resolution of the LiDAR. For example, the monoscopic resolution of a solid-state LiDAR is 76×250, and the solid-state LiDAR can include 76 pitch angles and 250 yaw angles. The echo signals at the multidimensional signal emission angles may be obtained by the LiDAR by adjusting a deflection angle of the scanning device. It can be understood that the multidimensional signal emission angles may also be implemented by adjusting different transmitters to perform fast scanning and emit a detection laser.

Herein, it can be understood that after receiving the echo signal, the computer device can buffer the echo signal based on the multidimensional signal emission angles. Specifically, the echo signal received by the computer device may also include a signal receiving sequence. The computer device is preconfigured with a plurality of memories. The computer device determines a preset memory corresponding to the echo signal based on the multidimensional signal emission angles and a signal receiving sequence. Further, the computer device buffers the echo signal into a determined preset memory.

Herein, it can be understood that the echo signal received by the computer device may include a signal receiving sequence. The signal receiving sequence may be an emission sequence number corresponding to the echo signal, or may be an emission moment corresponding to the echo signal. The computer device may be preconfigured with a plurality of memories. The plurality of memories can store a same number of echo signals. Each memory has corresponding storage capacity. The number of echo signals stored in each memory may be less than or equal to the storage capacity. The multidimensional signal emission angles may include a pitch angle and a yaw angle. A same pitch angle may correspond to a plurality of yaw angles, and a same yaw angle may also correspond to a plurality of pitch angles. The computer device may store a plurality of echo signals with the same pitch angle and different yaw angles into a corresponding memory. The computer device adjusts the pitch angle of the LiDAR, maintains the adjusted pitch angle, and then adjusts a yaw angle of the LiDAR in a direction opposite to that of the last emitted detection signal, to obtain the echo signal corresponding to the adjusted pitch angle. The computer device stores the echo signal corresponding to the adjusted pitch angle in another memory.

After the computer device buffers the echo signal, the buffered signal is obtained. The computer device determines whether the number of buffered signals reaches a preset buffering number. The preset buffering number is related to resolution of a detection field of view of the LiDAR.

In an embodiment, before buffering the echo signals based on the multidimensional signal emission angles, the method further includes: amplifying the received echo signal to obtain an amplified echo signal; performing analog-to-digital conversion on the amplified echo signal to obtain a converted digital signal; and filtering the converted digital signal.

The computer device amplifies the echo signal, thereby amplifying the weak echo signal for subsequent signal processing. The computer device performs analog-to-digital conversion on the amplified echo signal to process the echo signal. The computer device filters a converted digital signal. The filtering may be removing a direct current component from the echo signal, and a method for removing the direct current component may be using a high-pass filter for filtering. The computer device filters the converted digital signal, thereby avoiding interference from the direct current component.

S602. Determine distance information of a detected object based on the echo signal.

Herein, it can be understood that when the distance information of the detected object is determined based on the echo signal, the distance information of the detected object can be determined by reading the distance information corresponding to the echo signal based on the obtained echo signal.

Herein, it can be understood that the distance information of the detected object can also be determined based on a time region to which time of receiving the echo signal belongs. For example, the echo signal received within a first preset time range after the detection laser is emitted can be output to indicate the object is in a short distance; and the echo signal received within a second preset time range after the detection laser is emitted can be output to indicate the detected object is in a long distance. Herein, it can be understood that duration of the second preset time range is greater than duration of the first preset time range.

S603. When the distance information of the detected object is less than or equal to a preset distance value, superimpose a preset number of echo signals at each emission angle, and output a superimposed target signal.

Herein, it can be understood that, before superimposing a preset number of echo signals at each emission angle, the method further includes: retrieving the preset number of echo signals from a preset memory based on the emission angle. Herein, the preset number depends on a detection precision requirement for a LiDAR. It can be understood that the higher the precision is, the greater the preset number is.

Figure 6A:
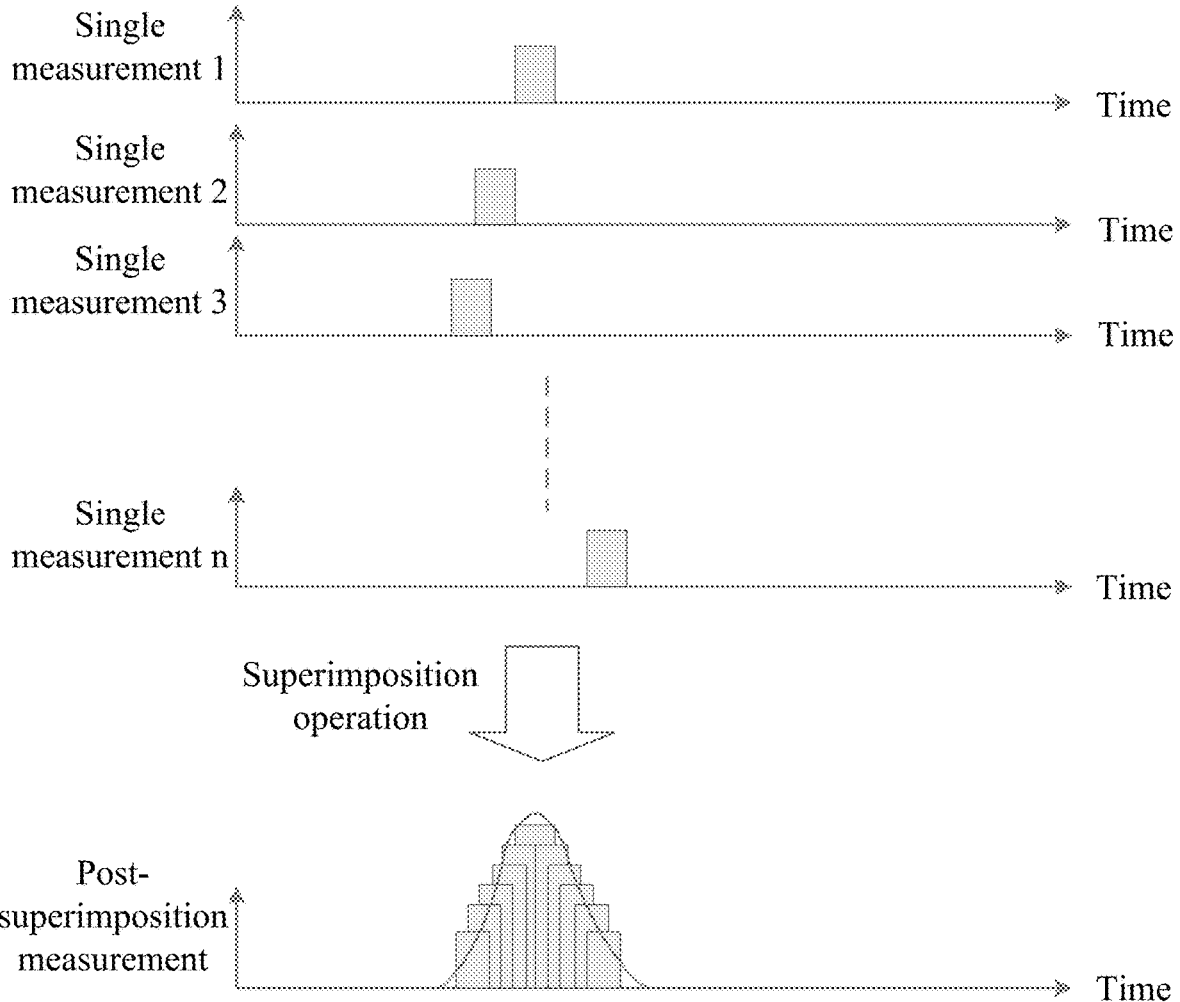
FIG. 6a is a schematic diagram of overlaying echo signals at all angles according to one or more embodiments.

Herein, specifically, as shown in FIG. 6a, the echo signals at each angle are superimposed to output the superimposed target signal.

S604. When the distance information of the detected object is greater than the preset distance value, perform non-coherent integration on multi-angle echo signals based on the preset neighborhood window, to obtain the integrated target signal.

Herein, it can be understood that before performing non-coherent integration on multi-angle echo signals based on the preset neighborhood window, the method further includes: obtaining a receiving sequence of multi-angle echo signals; and setting the preset neighborhood window based on the receiving sequence of multi-angle echo signals.

Figure 6D:
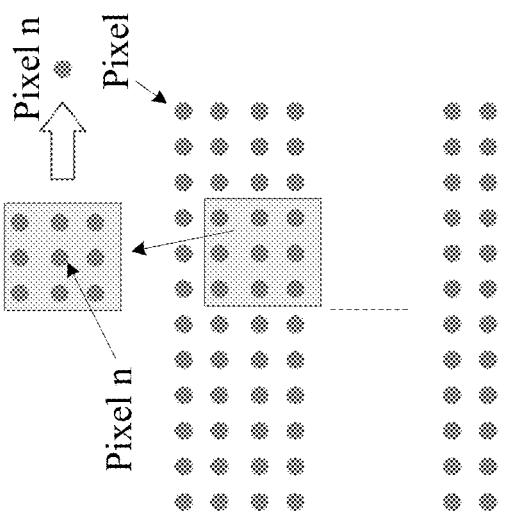
FIGS. 6b to 6d are schematic diagrams of setting a preset neighborhood window according to one or more embodiments.
Figure 6C:
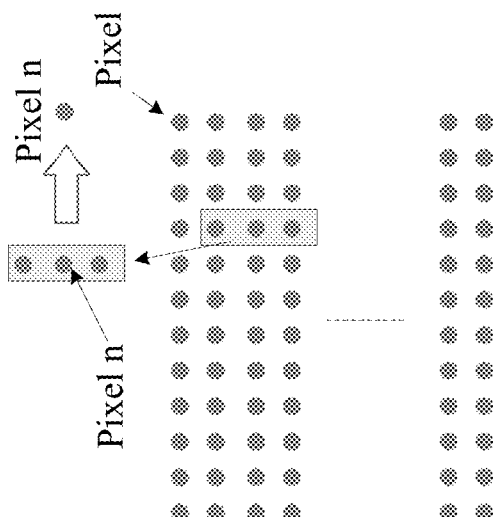
Figure 6B:
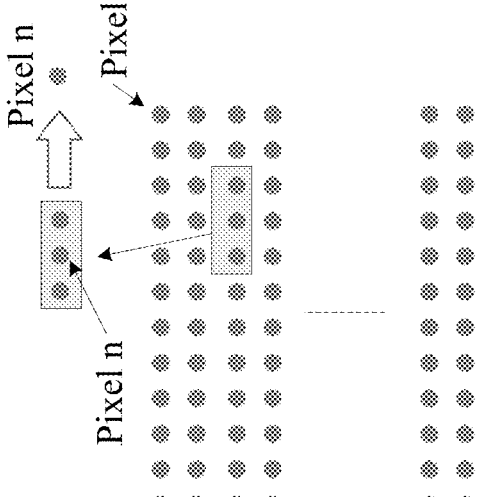

Herein, it may be understood that in a case where output delay of the detection point cloud is minimum, for a design of performing scanning chronologically in the horizontal direction, preferably, a preset neighborhood window is set in the horizontal direction for integration; for a design of performing scanning chronologically in the vertical direction, preferably, the preset neighborhood window is set in the vertical direction for integration; and for a design of performing scanning chronologically through integration of a matrix block, that is, a design of performing emission with the matrix block as the minimum unit, preferably, the preset neighborhood window is set based on the matrix block for integration. In a case where the output delay of the measured point cloud is ruled out, the optimal ranging performance may be implemented for the matrix block integration. Specifically, FIG. 6b, FIG. 6c, and FIG. 6d show design diagrams of three different arrangements of preset neighborhood windows.

Herein, it can be understood that obtaining an original waveform of an echo signal at any angle in multi-angle echo signals can be obtaining a result in one measurement. In a preferred embodiment, as shown in FIG. 6a, to obtain better ranging performance, the echo signal at any angle can also be a superimposed echo signal obtained by integrating multiple measurement results.

Herein, in an optional embodiment, before performing non-coherent integration on the multi-angle echo signals based on the preset neighborhood window, the method further includes: obtaining similarity of echo data of close angles within the preset neighborhood window; and when the similarity is greater than a preset threshold, performing non-coherent integration based on the preset neighborhood window, to obtain an integrated target signal; or when the similarity is less than or equal to the preset threshold, adjusting the preset neighborhood window based on a similarity value.

Herein, it can be understood that when similarity is calculated, a difference between echo areas of close data may be used as a determining basis; a difference between echo start moments of close data may further be used as the determining basis; or both the difference between the echo areas and the difference between the echo start moments may be used as the determining basis. Based on different distance scenarios, a threshold Th_Area is set for the difference between different echo areas, and a threshold Th_start is set for the difference between different echo start moments. Herein, it can be understood that the farther the distance is, the greater the threshold Th_Area is set for the difference between the echo areas, and the farther the distance is, the greater the threshold Th_start is set for the difference between different echo start moments. When both the difference between the echo areas and the difference between the echo start moments are used as the determining basis, if the difference between the echo areas of the close data is less than or equal to Th_Area and the difference between the echo start moments of the close data is less than or equal to Th_start, this indicates that the close data is similar; otherwise, this indicates that the close data is not similar.

Herein, in an optional embodiment, when the similarity is less than or equal to the preset threshold, adjusting the preset neighborhood window based on the similarity value includes: when it is determined that a total similarity value of the corresponding echo signals in the preset neighborhood window is less than the preset threshold, calculating similarity of any two close echo signals in the preset neighborhood window separately, to determine echo signals with a similarity value different from that of other echo signals within the preset neighborhood window; and based on angle information of the determined echo signals with the similarity value different from that of other echo signals in the preset neighborhood window, adjusting the preset neighborhood window, so that the similarity value of the echo signals included in the preset neighborhood window is greater than the preset threshold.

For example, FIG. 6e shows a specific adjustment process of the preset neighborhood window. As shown in FIG. 6e(a), an initial preset neighborhood window includes echo signals such as A1, A2, A3, B1, B2, B3, C1, C2, and C3, similarity of the echo signals such as A1, A2, A3, B1, B2, B3, C1, C2, and C3 in the initial preset neighborhood window is determined, and if the similarity of A3, B3, and C3 does not meet a preset requirement, the preset neighborhood window is adjusted in a manner shown in FIG. 6e(b).

In this embodiment, the echo signal is obtained, where the echo signal includes multidimensional signal emission angles; the distance information of the detected object is determined based on the echo signal; and when the distance information of the detected object is less than or equal to a preset distance value, a preset number of echo signals at each emission angle is superimposed, and a superimposed target signal is output; or when the distance information of the detected object is greater than the preset distance value, non-coherent integration is performed on multi-angle echo signals based on the preset neighborhood window, to obtain the integrated target signal. Different echo signal processing methods are used for echo signals at different distances, to improve the signal-to-noise ratio of signals at different distances, thereby improving the ranging capability of the LiDAR. It can be understood that, for a signal at a short distance, superimposing the multiple emission echoes of signals at each angle can improve the signal-to-noise ratio of the echo signals at each angle and improve the detection capability. For an echo signal at a long distance, not only the echo signals at each angle are superimposed to improve the signal-to-noise ratio of the echo signals at each angle, but also non-coherent integration can be performed on the echo signals on this basis, and spatial correlation between echo signals at multidimensional signal emission angles is used, to increase the amount of signal integration when the phase of the target signal is lost, thereby improving the signal-to-noise ratio of the echo signals, and further effectively improving the ranging capability of the echo signals. In addition, in this embodiment of the application, similarity of the echo signals in the preset neighborhood window is determined, to ensure accuracy of non-coherently integrated signals, thereby further improving the ranging capability.

In another embodiment, referring to FIG. 7, FIG. 7 is a schematic flowchart of a LiDAR echo signal processing method according to an embodiment of this application. The method includes the following steps:

S701. Obtain an echo signal, where the echo signal includes multidimensional signal emission angles.

The LiDAR emits a detection signal. After the detection signal reaches the to-be-detected object, the echo signal is reflected, and the LiDAR receives the echo signal through the receiver. The computer device receives the echo signal sent by the LiDAR. The echo signals may include a preamble signal, a valid echo signal, a false echo signal, and ambient noise. The echo signal includes multidimensional signal emission angles. The multidimensional signal emission angles may include a pitch angle and a yaw angle. A same pitch angle may correspond to a plurality of yaw angles, and a same yaw angle may also correspond to a plurality of pitch angles. Different signal emission angles can correspond to emission and receiving of independent signals, that is, different detection signals and echo signals. The number of signal emission angles may be determined based on monoscopic resolution of the LiDAR. For example, the monoscopic resolution of a solid-state LiDAR is 76×250, and the solid-state LiDAR can include 76 pitch angles and 250 yaw angles. The echo signals at the multidimensional signal emission angles may be obtained by the LiDAR by adjusting a deflection angle of the scanning device. It can be understood that the multidimensional signal emission angles may also be implemented by adjusting different transmitters to perform fast scanning and emit a detection laser.

Herein, it can be understood that after receiving the echo signal, the computer device can buffer the echo signal based on the multidimensional signal emission angles. Specifically, the echo signal received by the computer device may also include a signal receiving sequence. The computer device is preconfigured with a plurality of memories. The computer device determines a preset memory corresponding to the echo signal based on the multidimensional signal emission angles and a signal receiving sequence. Further, the computer device buffers the echo signal into a determined preset memory.

S702. Determine distance information of a detected object based on distance information of the echo signal.

Herein, it can be understood that when the distance information of the detected object is determined based on the echo signal, the distance information of the detected object can be determined by reading the distance information corresponding to the echo signal based on the obtained echo signal.

Herein, it can be understood that the distance information of the detected object can also be determined based on a time region to which time of receiving the echo signal belongs. For example, the echo signal received within a first preset time range after the detection laser is emitted can be output to indicate the object is in a short distance; and the echo signal received within a second preset time range after the detection laser is emitted can be output to indicate the detected object is in a long distance. Herein, it can be understood that duration of the second preset time range is greater than duration of the first preset time range.

S703. When the distance information of the detected object is less than or equal to a preset distance value, superimpose a preset number of echo signals at each emission angle, and output a superimposed target signal.

Herein, it can be understood that, before superimposing a preset number of echo signals at each emission angle, the method further includes: retrieving the preset number of echo signals from a preset memory based on the emission angle.

Herein, specifically, as shown in FIG. 6a, the echo signals at each angle are superimposed to output the superimposed target signal.

S704. When the distance information of the detected object is greater than the preset distance value, obtain a multi-angle echo signal corresponding to a central field of view.

Herein, it can be understood that definition of the central field of view and a peripheral field of view of the LiDAR is related to a design parameter of the LiDAR. In an example, it is believed that the central field of view accounts for 50% of the overall detection field of view, that is, in the case of a horizontal detection angle of view of 120 degrees, it is believed that the middle 60 degrees is the central field of view in the horizontal direction. It is a similar case with the vertical direction, that is, in the case of a vertical detection angle of view of 40 degrees, it is believed that the middle 20 degrees is the central field of view in the vertical direction.

Figure 7A:
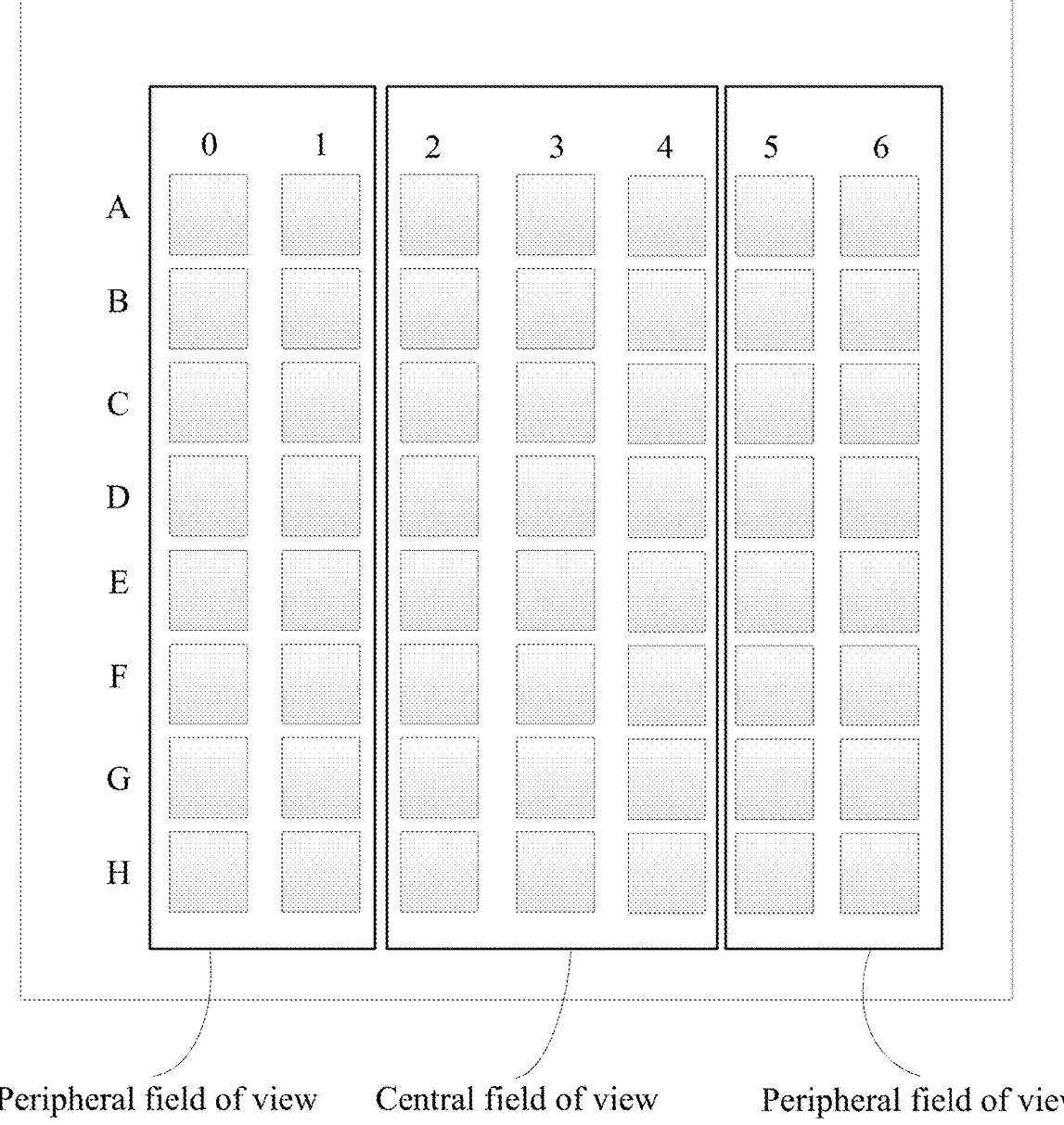
FIG. 7a is a schematic diagram of a center detection field of view and an edge detection field of view in a detection field of view of a LiDAR according to one or more embodiments.

FIG. 7*a* is a schematic diagram of a central field of view and a peripheral field of view in a receiving field of view.

Herein, it can be understood that obtaining multi-angle echo signals corresponding to the central field of view specifically includes: obtaining a horizontal field of view range and/or a vertical field of view range corresponding to the central field of view; and retrieving the echo signals corresponding to the central field of view from a preset memory based on the horizontal field of view range and/or the vertical field of view range corresponding to the central field of view.

S705. Perform non-coherent integration on the multi-angle echo signals corresponding to the central field of view based on a preset neighborhood window, to obtain an integrated target signal corresponding to the central field of view.

Herein, in an optional embodiment, before performing non-coherent integration on the multi-angle echo signals corresponding to the central field of view based on a preset neighborhood window, the method further includes: obtaining a receiving sequence of multi-angle echo signals; and setting the preset neighborhood window based on the receiving sequence of multi-angle echo signals.

Herein, it can be understood that obtaining an original waveform of an echo signal at any angle in multi-angle echo signals can be obtaining a result in one measurement. In a preferred embodiment, as shown in FIG. 6*a*, to obtain better ranging performance, the echo signal at any angle can also be a superimposed echo signal obtained by integrating multiple measurement results.

Herein, in an optional embodiment, before performing non-coherent integration on the multi-angle echo signals corresponding to the central field of view based on a preset neighborhood window, the method further includes:

obtaining similarity of echo data of close angles within the preset neighborhood window; and when the similarity is greater than a preset threshold, performing non-coherent integration based on the preset neighborhood window, to obtain an integrated target signal; or when the similarity is less than or equal to the preset threshold, adjusting the preset neighborhood window based on a similarity value.

Herein, it can be understood that when similarity is calculated, a difference between echo areas of close data may be used as a determining basis; a difference between echo start moments of close data may further be used as the determining basis; or both the difference between the echo areas and the difference between the echo start moments may be used as the determining basis. Based on different distance scenarios, a threshold Th_Area is set for the difference between different echo areas, and a threshold Th_start is set for the difference between different echo start moments. Herein, it can be understood that the farther the distance is, the greater the threshold Th_Area is set for the difference between the echo areas, and the farther the distance is, the greater the threshold Th_start is set for the difference between different echo start moments. When both the difference between the echo areas and the difference between the echo start moments are used as the determining basis, if the difference between the echo areas of the close data is less than or equal to Th_Area and the difference between the echo start moments of the close data is less than or equal to Th_start, this indicates that the close data is similar; otherwise, this indicates that the close data is not similar.

Herein, in an optional embodiment, when the similarity is less than or equal to the preset threshold, adjusting the preset neighborhood window based on the similarity value includes: when it is determined that a total similarity value of the corresponding echo signals in the preset neighborhood window is less than the preset threshold, calculating similarity of any two close echo signals in the preset neighborhood window separately, to determine echo signals with a similarity value different from that of other echo signals within the preset neighborhood window; and based on angle information of the determined echo signals with the similarity value different from that of other echo signals in the preset neighborhood window, adjusting the preset neighborhood window, so that the similarity value of the echo signals included in the preset neighborhood window is greater than the preset threshold.

S706. Obtain multi-angle echo signals corresponding to the peripheral field of view, and superimpose an echo signal at each emission angle corresponding to the peripheral field of view, to output a superimposed target signal corresponding to the peripheral field of view.

Herein, it can be understood that obtaining multi-angle echo signals corresponding to the peripheral field of view specifically includes: obtaining a horizontal angle of view range and/or a vertical angle of view range corresponding to the peripheral field of view; and retrieving the echo signals corresponding to the peripheral field of view from a preset memory based on the horizontal angle of view range and/or the vertical angle of view range corresponding to the peripheral field of view.

In this embodiment, the echo signal is obtained, where the echo signal includes multidimensional signal emission angles; the distance information of the detected object is determined based on the echo signal; when the distance information of the detected object is less than or equal to a preset distance value, a preset number of echo signals at each emission angle is superimposed, and a superimposed target signal is output; or when the distance information of the detected object is greater than the preset distance value, the multi-angle echo signal corresponding to the central field of view is obtained; non-coherent integration is performed on the multi-angle echo signals corresponding to the central field of view based on the preset neighborhood window, to obtain the integrated target signal corresponding to the central field of view; the multi-angle echo signals corresponding to the peripheral field of view are obtained, and an echo signal at each emission angle corresponding to the peripheral field of view is superimposed, to output a superimposed target signal corresponding to the peripheral field of view. Different echo signal processing methods are used for echo signals at different distances, to improve the signal-to-noise ratio of signals at different distances, thereby improving the ranging capability of the LiDAR. It can be understood that, for a signal at a short distance, superimposing the multiple emission echoes of signals at each angle can improve the signal-to-noise ratio of the echo signals at each angle and improve the detection capability. For an echo signal at a long distance, not only the echo signals at each angle are superimposed to improve the signal-to-noise ratio of the echo signals at each angle, but also non-coherent integration can be performed on the echo signals on this basis, and spatial correlation between echo signals at multidimensional signal emission angles is used, to increase the amount of signal integration when the phase of the target signal is lost, thereby improving the signal-to-noise ratio of the echo signals, and further effectively improving the ranging capability of the echo signals. Further, based on an actual application scenario of performing ranging in the main central field of view of the LiDAR and filling blind spots in the peripheral field of view, non-coherent integration is performed on the central field of view, and the echo signal at each angle is superimposed for the peripheral field of view, to improve the signal-to-noise ratio and the ranging capability, thereby further reducing an amount of calculation. In addition, in this embodiment of this application, similarity of the echo signals in the preset neighborhood window is determined, to ensure accuracy of non-coherently integrated signals, thereby further improving the ranging capability.

Figure 8:
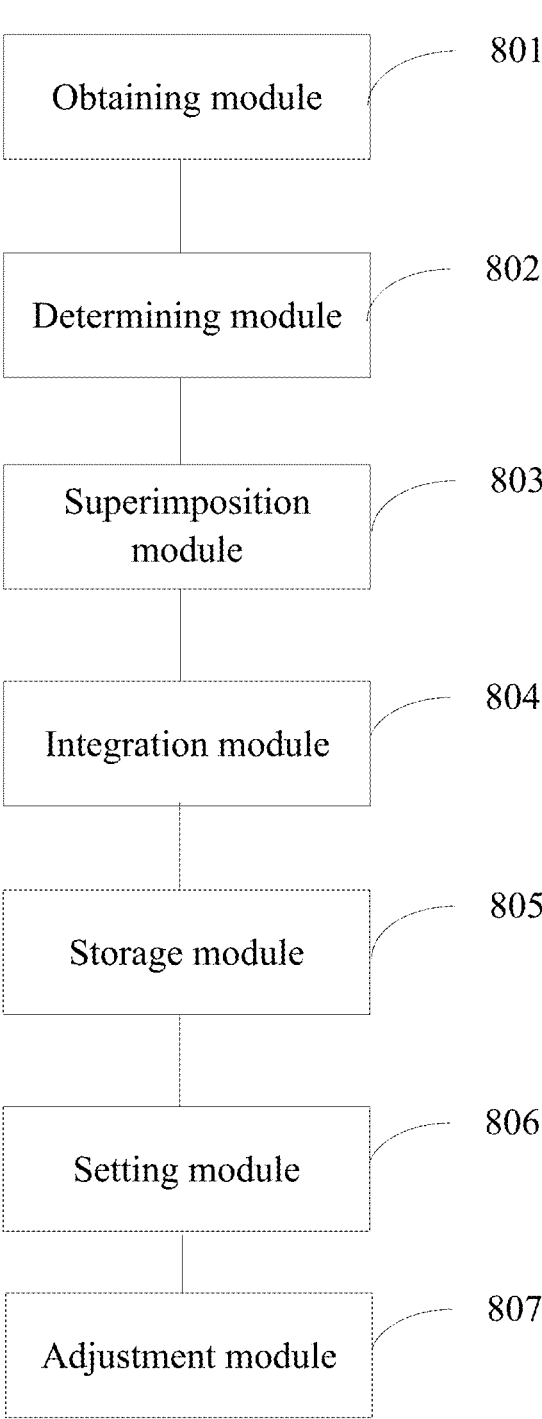
FIG. 8 is a block diagram of a LiDAR echo signal processing device according to one or more embodiments.

Referring to FIG. 8, FIG. 8 shows a LiDAR echo signal processing device 800 according to an embodiment of this application. The LiDAR echo signal processing device 800 includes an obtaining module 801, a determining module 802, a superimposition module 803, and an integration module 804, where the obtaining module 801 is configured to obtain an echo signal, where the echo signal includes multidimensional signal emission angles;

the determining module 802 is configured to determine a distance of a detected object based on distance information of the echo signal;

the superimposition module 803 is configured to: when the distance information of the detected object is less than or equal to a preset range, superimpose a preset number of echo signals at each emission angle, and output a superimposed target signal; and the integration module 804 is configured to: when the distance information of the detected object is greater than the preset range, perform non-coherent integration on multi-angle echo signals based on the preset neighborhood window, to obtain the integrated target signal.

In an embodiment, the device may further include a storage module 805, where the storage module 805 is configured to determine a preset memory corresponding to the echo signal based on the multidimensional signal emission angles and a signal receiving sequence of echo signals; and buffer the echo signal into the corresponding preset memory.

In an embodiment, the foregoing device may further include a setting module 806, where the obtaining module 801 is configured to obtain a receiving sequence of multi-angle echo signals; and the setting module 806 is configured to set the preset neighborhood window based on the receiving sequence of multi-angle echo signal.

In an embodiment, the foregoing device may further include an adjustment module 807, where the obtaining module 801 is further configured to obtain similarity of echo data of close angles within the preset neighborhood window;

the integration module 804 is configured to: when the similarity is greater than a preset threshold, perform non-coherent integration based on the preset neighborhood window, to obtain an integrated target signal; and the adjustment module 807 is configured to: when the similarity is less than or equal to the preset threshold, adjust the preset neighborhood window based on a similarity value.

For a specific limitation on the LiDAR echo signal processing device 800, refer to a limitation on S601 to S604 of the LiDAR echo signal processing method above. Details are not described herein again. Each module in the foregoing LiDAR echo signal processing device may be implemented completely or partially through software, hardware, and a combination thereof. The foregoing modules may be embedded in or independent of a processor in the computer device in the form of hardware, or stored in the memory in the computer device in the form of software, to be invoked by the processor to perform operations corresponding to the foregoing modules.

Figure 9:
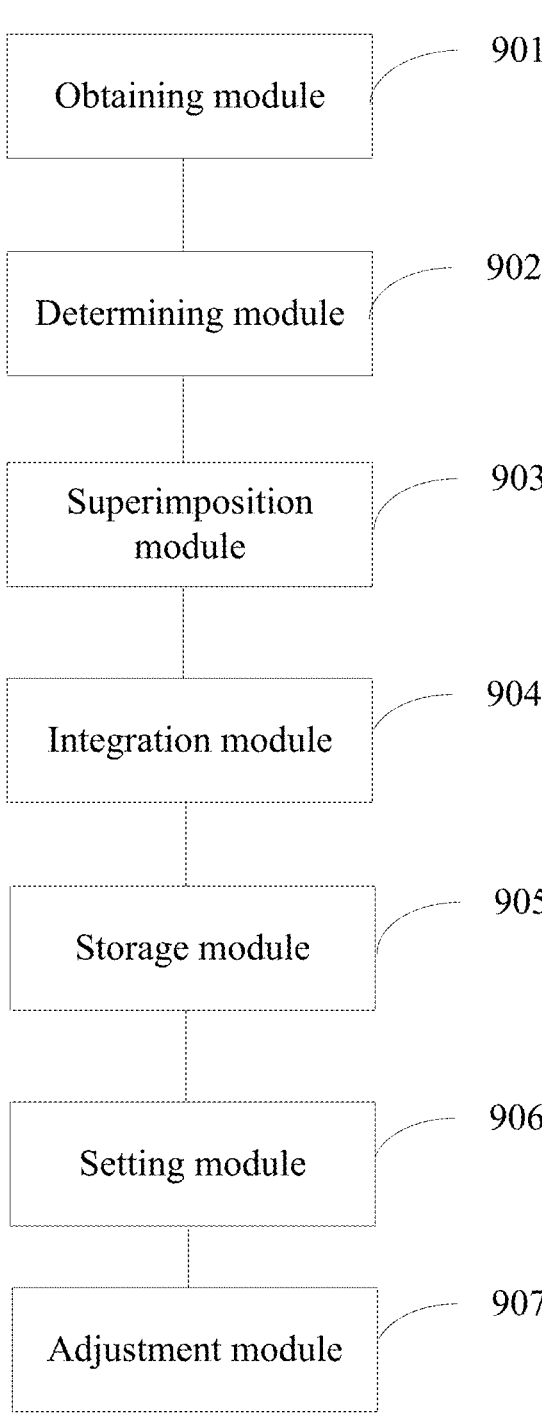
FIG. 9 is a block diagram of another LiDAR echo signal processing device according to one or more embodiments.

Referring to FIG. 9, FIG. 9 shows a LiDAR echo signal processing device 900 according to an embodiment of this application. The LiDAR echo signal processing device 900 includes an obtaining module 901, a determining module 902, a superimposition module 903, and an integration module 904, where the obtaining module 901 is configured to obtain an echo signal, where the echo signal includes multidimensional signal emission angles;

the determining module 902 is configured to determine a distance of a detected object based on distance information of the echo signal;

the superimposition module 903 is configured to: when the distance information of the detected object is less than or equal to a preset range, superimpose a preset number of echo signals at each emission angle, and output a superimposed target signal;

the obtaining module 901 is further configured to: when the distance information of the detected object is greater than the preset range, obtain a multi-angle echo signal corresponding to a central field of view;

the integration module 904 is configured to perform non-coherent integration on the multi-angle echo signals corresponding to the central field of view based on a preset neighborhood window, to obtain an integrated target signal;

the obtaining module 901 is further configured to obtain multi-angle echo signals corresponding to the peripheral field of view; and the superimposition module 903 is further configured to superimpose an echo signal at each emission angle corresponding to the peripheral field of view, to output a superimposed target signal corresponding to the peripheral field of view.

In an optional embodiment, the device includes a storage module 905, where the storage module 905 is configured to determine a preset memory corresponding to the echo signal based on the multidimensional signal emission angles and a signal receiving sequence of echo signals; and buffer the echo signal into the corresponding preset memory.

In an optional embodiment, the device may further include a setting module 906, where the obtaining module 901 is configured to obtain a receiving sequence of multi-angle echo signals; and the setting module 906 is configured to set the preset neighborhood window based on the receiving sequence of multi-angle echo signals.

In an optional embodiment, the device may further include an adjustment module 907, where the obtaining module 901 is further configured to obtain similarity of echo data of close angles within the preset neighborhood window;

the integration module 904 is configured to: when the similarity is greater than a preset threshold, perform non-coherent integration based on the preset neighborhood window, to obtain an integrated target signal; and the adjustment module 907 is configured to: when the similarity is less than or equal to the preset threshold, adjust the preset neighborhood window based on a similarity value.

Figure 10:
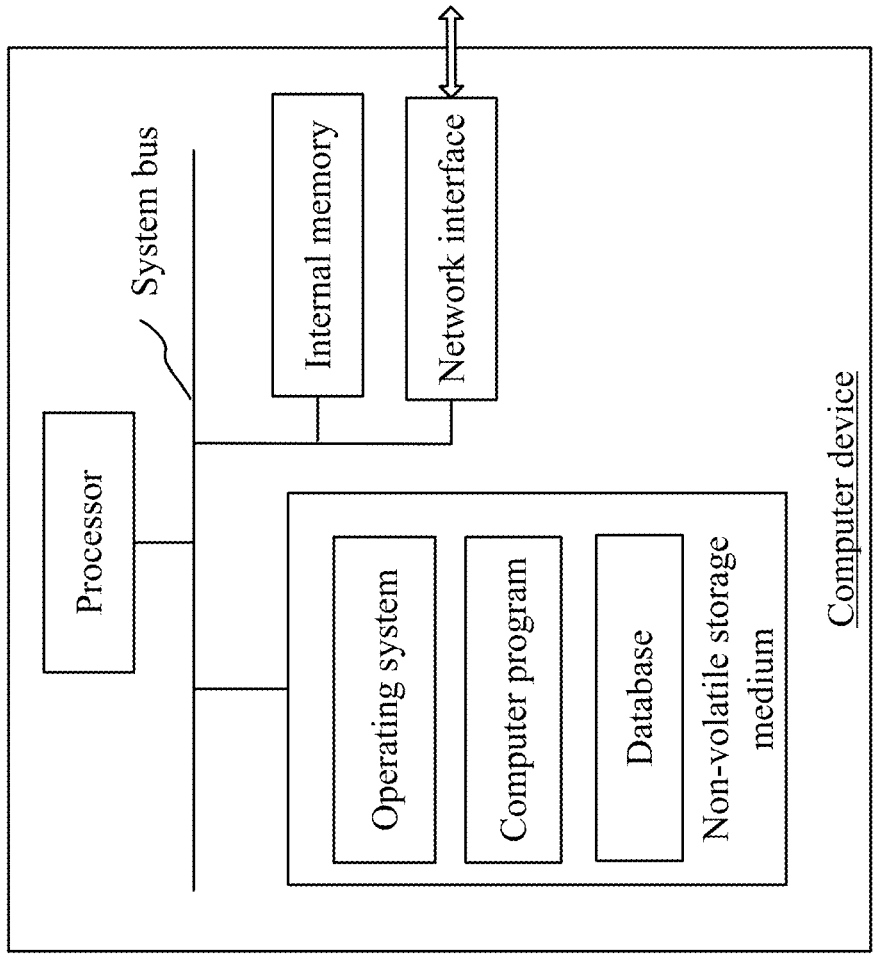
FIG. 10 is a block diagram of a computer device according to one or more embodiments.

For a specific limitation on the LiDAR echo signal processing device 900, refer to a limitation on S701 to S706 of the LiDAR echo signal processing method above. Details are not described herein again. Each module in the foregoing LiDAR echo signal processing device may be implemented completely or partially through software, hardware, and a combination thereof. The foregoing modules may be embedded in or independent of a processor in the computer device in the form of hardware, or stored in the memory in the computer device in the form of software, to be invoked by the processor to perform operations corresponding to the foregoing modules. In another embodiment, a computer device is provided. An internal structural diagram of the computer device is shown in FIG. 10. The computer device includes a processor, a memory, a communications interface, and a database connected through a system bus. The processor of the computer device is configured to provide computing and control capabilities. Memories of the computer device include a non-volatile storage medium and an internal memory. The non-volatile storage medium stores an operating system, a computer-readable instructions, and a database. The internal memory provides an environment for running the operating system and the computer-readable instructions in the non-volatile storage medium. The database of the computer device is used to store an echo signal and a target signal. The communications interface of the computer device is configured to connect to and communicate with the LiDAR. When being executed by the processor, the computer-readable instructions are used to implement any one of the foregoing LiDAR echo signal processing method.

A person skilled in the art can understand that FIG. 10 is only a block diagram of a partial structure related to the solution of this application, and does not constitute a limitation on the computer device to which the solution of this application is applied. The computer device may specifically include more or fewer components than those shown in the figure, or a combination of some components, or a different component arrangement.

One or more non-volatile computer-readable storage media storing computer-readable instructions are provided, and when being executed by one or more processors, the computer-readable instructions enable the one or more processors to perform the steps in the foregoing method embodiments.

A person of ordinary skills in the art can understand that all or some procedures in the method in the foregoing embodiments can be implemented by instructing relevant hardware via the computer-readable instructions. The computer-readable instructions can be stored in a non-volatile computer-readable storage medium. When being executed, the computer-readable instructions can include the procedures in the method embodiments. Any mentioned memory, storage, database, or other media used in the embodiments of this application may include the non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed buffer memory. For a purpose of description instead of limitation, there may be various forms of RAMs, such as a static RAM (SRAM), a dynamic RAM (DRAM), a synchronous DRAM (SDRAM), a double data rate SDRAM (DDRSDRAM), an enhanced SDRAM (ESDRAM), a Synchlink (Synchlink) DRAM (SLDRAM), a Rambus (Rambus) direct RAM (RDRAM), a direct Rambus dynamic RAM (DRDRAM), and a Rambus dynamic RAM (RDRAM).

Technical features in the foregoing embodiments can be randomly combined. For brevity, all possible combinations of the technical features in the foregoing embodiments are not described. However, so long as the combinations of these technical features are not contradictory, the combinations should be considered as falling within the scope provided by this specification.

The foregoing embodiments only describe several embodiments of this application, and the descriptions are specific and detailed, but should not be construed as a limitation on the scope of the application. It should be noted that a person of ordinary skills in the art may further make changes and improvements without departing from the spirit of this application, and these changes and improvements shall fall within the protection scope of this application. Therefore, the protection scope of this patent application shall be subject to the appended claims.

What is claimed is:

1. A LiDAR echo signal processing method, comprising:
receiving an echo signal reflected by a to-be-detected object, wherein an emission angle of a detection signal corresponding to the echo signal includes a pitch angle and a yaw angle;
buffering the echo signal based on the pitch angle and the yaw angle to obtain buffered signals;
in response to the number of buffered signals reaching a preset buffering number, extracting a target signal corresponding to a preset neighborhood window from the buffered signals; and
performing non-coherent integration on the target signal and outputting the integrated target signal,
wherein buffering the echo signal based on the pitch angle and the yaw angle comprises:
determining a preset memory corresponding to the echo signal based on the pitch angle, the yaw angle and a signal receiving sequence of echo signals; and
buffering the echo signal into the corresponding preset memory.

2. The method according to claim 1, further comprising:
arranging a plurality of preset memories into a plurality of storage rows, wherein each preset memory corresponds to one storage row, and is configured to store echo signals that correspond to a preset receiving sequence and have the same first emission angle; and
correspondingly arranging storage columns of the plurality of preset memories to obtain a plurality of matrix columns, wherein each matrix column is configured to store the echo signals with the same second emission angle.

3. The method according to claim 2, wherein the method further comprises:
determining the number of storage rows of the preset neighborhood window based on the number of storage rows corresponding to the plurality of preset memories, wherein each storage row of the preset neighborhood window is configured to store the buffered signals in the preset signal receiving sequence that is extracted from the preset memory; and
based on the storage column of the plurality of preset memories, correspondingly storing the buffered signals stored in the storage row of the preset neighborhood window.

4. The method according to claim 1, wherein in response to the number of buffered signals reaching a preset buffering number, the extracting a target signal corresponding to a preset neighborhood window from the buffered signals comprises:
in response to the number of buffered signals reaching the preset buffering number, extracting a history signal from the buffered signals based on the preset signal receiving sequence and a preset extraction number; and obtaining a target signal corresponding to the preset neighborhood window based on the extracted history signal.

5. The method according to claim 1, wherein the performing non-coherent integration on the target signal comprises:

obtaining a corresponding signal sequence based on the target signal;

determining a signal length corresponding to the target signal in the signal sequence; and performing non-coherent integration on the target signal based on the signal length corresponding to the target signal and a preset relationship.

6. The method according to claim 1, wherein before the buffering the echo signal based on the pitch angle and the yaw angle, the method further comprises:

amplifying the received echo signal to obtain an amplified echo signal;

performing analog-to-digital conversion on the amplified echo signal to obtain a converted digital signal; and filtering the converted digital signal.

7. The method according to claim 1, wherein the echo signal comprises a signal receiving sequence, and the method further comprises:

in response to the number of received echo signals exceeding the preset buffering number, using echo signals outnumbered in comparison with the buffering number as to-be-processed signals;

determining a first signal corresponding to a next preset emission period based on an earliest echo signal in a signal receiving sequence in the buffered signals, and overwriting the earliest echo signal in the signal receiving sequence based on the first signal;

determining a second signal corresponding to the next preset emission period based on the first signal in the buffered signals, and overwriting the first signal based on the second signal;

re-performing the step of overwriting a signal in the buffered signals, and overwriting a buffered signal in the previous preset emission period with a buffered signal in the current preset emission period in the buffered signals until a corresponding buffered signal in the previous preset emission period is overwritten with the to-be-processed signal; and extracting the target signal corresponding to the preset neighborhood window from the overwritten buffered signal.

8. A LiDAR echo signal processing device, comprising:

a receiving module, configured to receive an echo signal reflected by a to-be-detected object, wherein an emission angle of a detection signal corresponding to the echo signal includes a pitch angle and a yaw angle;

a buffering module, configured to buffer the echo signal based on the pitch angle and the yaw angle to obtain buffered signals;

an extraction module, configured to, in response to the number of buffered signals reaching a preset buffering number, extract a target signal corresponding to a preset neighborhood window from the buffered signals; and an integration module, configured to perform non-coherent integration on the target signal and output the integrated target signal, wherein the buffering module is further configured to determine a preset memory corresponding to the echo signal based on the pitch angle, the yaw angle and a signal receiving sequence of echo signals, and buffer the echo signal into the corresponding preset memory.

9. The device according to claim 8, wherein the device further comprises:

an arrangement module, configured to arrange a plurality of preset memories into a plurality of storage rows, wherein each preset memory corresponds to one storage row, and is configured to store echo signals that correspond to a preset receiving sequence and have the same first emission angle; and correspondingly arrange storage columns of the plurality of preset memories to obtain a plurality of matrix columns, wherein each matrix column is used to store the echo signals at the same second emission angle.

10. The device according to claim 9, wherein the device further comprises:

a determining module, configured to determine the number of storage rows of the preset neighborhood window based on the number of storage rows corresponding to the plurality of preset memories, wherein each storage row of the preset neighborhood window is configured to store the buffered signals in the preset signal receiving sequence that is extracted from the preset memory; and based on the storage column of the plurality of preset memories, correspondingly store the buffered signals stored in the storage row of the preset neighborhood window.

11. The device according to claim 8, wherein the extraction module is further configured to:

in response to the number of buffered signals reaching the preset buffering number, extract a history signal from the buffered signals based on the preset signal receiving sequence and a preset extraction number; and obtain a target signal corresponding to the preset neighborhood window based on the extracted history signal.

12. The device according to claim 8, wherein the integration module is further configured to:

obtain a corresponding signal sequence based on the target signal;

determine a signal length corresponding to the target signal in the signal sequence; and perform non-coherent integration on the target signal based on the signal length corresponding to the target signal and a preset relationship.

13. The device according to claim 8, wherein the device further comprises:

a preprocessing module, configured to:

amplify the received echo signal to obtain an amplified echo signal;

perform analog-to-digital conversion on the amplified echo signal to obtain a converted digital signal; and filter the converted digital signal.

14. The device according to claim 8, wherein the device further comprises:

an overwriting module, configured to: in response to the number of received echo signals exceeding the preset buffering number, use echo signals outnumbered in comparison with the buffering number as to-be- processed signals;

determine a first signal corresponding to a next preset emission period based on an earliest echo signal in a signal receiving sequence in the buffered signals, and overwrite the earliest echo signal in the signal receiving sequence based on the first signal;

determine a second signal corresponding to the next preset emission period based on the first signal in the buffered signals, and overwrite the first signal based on the second signal;

re-perform the step of overwriting a signal in the buffered signals, and overwrite a buffered signal in the previous preset emission period with a buffered signal in the current preset emission period in the buffered signals until a corresponding buffered signal in the previous preset emission period is over-written with the to-be-processed signal; and extract the target signal corresponding to the preset neighborhood window from the overwritten buffered signal.

15. A computer device, comprising a memory and one or more processors, wherein the memory stores computer-readable instructions, and when executed by the one or more processors, the computer-readable instructions enable the one or more processors to perform:

receiving an echo signal reflected by a to-be-detected object, wherein an emission angle of a detection signal corresponding to the echo signal includes a pitch angle and a yaw angle;

buffering the echo signal based on the pitch angle and the yaw angle to obtain buffered signals;

in response to the number of buffered signals reaching a preset buffering number, extracting a target signal corresponding to a preset neighborhood window from the buffered signals; and performing non-coherent integration on the target signal and outputting the integrated target signal;

wherein buffering the echo signal based on the pitch angle and the yaw angle comprises:

determining a preset memory corresponding to the echo signal based on the pitch angle, the yaw angle and a signal receiving sequence of echo signals; and buffering the echo signal into the corresponding preset memory.

\* \* \* \* \*